United States Patent
Vuppala et al.

(10) Patent No.: US 8,427,319 B2
(45) Date of Patent: Apr. 23, 2013

(54) SYSTEM AND METHOD FOR REAL TIME THEFT DETECTION

(75) Inventors: Sunil Kumar Vuppala, Marathahalli (IN); Puneet Gupta, Bangalore (IN); Kirti Chawla, Charlottesville, VA (US)

(73) Assignee: Infosys Technologies Limited (IN)

( * ) Notice: Subject to any disclaimer, the term of this patent is extended or adjusted under 35 U.S.C. 154(b) by 483 days.

(21) Appl. No.: 12/632,133

(22) Filed: Dec. 7, 2009

(65) Prior Publication Data

US 2010/0148966 A1 Jun. 17, 2010

Related U.S. Application Data

(60) Provisional application No. 61/201,598, filed on Dec. 12, 2008.

(51) Int. Cl.
*G08B 13/14* (2006.01)

(52) U.S. Cl.
USPC ............ 340/572.1; 340/568.1; 340/10.1; 340/572.8

(58) Field of Classification Search ........... 340/572.1
See application file for complete search history.

(56) References Cited

U.S. PATENT DOCUMENTS

| | | | |
|---|---|---|---|
| 6,072,393 A | 6/2000 | Todd | |
| 6,650,231 B1* | 11/2003 | Byrne | 455/567 |
| 6,774,685 B2 | 8/2004 | O'Toole et al. | |
| 7,148,801 B2* | 12/2006 | Crabtree et al. | 340/539.13 |
| 7,187,287 B2 | 3/2007 | Ryal | |
| 7,190,257 B2 | 3/2007 | Maltseff et al. | |
| 2002/0044058 A1* | 4/2002 | Heinrich et al. | 340/572.1 |
| 2004/0080419 A1* | 4/2004 | Martin et al. | 340/573.1 |
| 2004/0212504 A1* | 10/2004 | Forcier et al. | 340/572.1 |
| 2005/0287986 A1 | 12/2005 | Sathe et al. | |

* cited by examiner

*Primary Examiner* — Kerri McNally
(74) *Attorney, Agent, or Firm* — Lerner, David, Littenberg, Krumholz & Mentlik, LLP

(57) ABSTRACT

A method for tracking one or more portable devices in real time to detect theft of the one or more portable devices is provided. The method enables, firstly, interrogating a Radio Frequency Identification (RFID) tag via a RFID reader during successive sweep intervals. The sweep interval represents active state of the RFID reader. Secondly, the method enables receiving one or more pairing information from the RFID tag. Further, the method enables comparing the one or more pairing information with corresponding one or more pairing information stored in the RFID reader. Finally, the method enables generating an alert signal via the wearable-band or the one or more portable devices when the one or more pairing information does not match with the corresponding one or more pairing information stored in the RFID reader.

18 Claims, 23 Drawing Sheets

| # | ER | | Fields saved by ER | Error Correction Bits | Size of T - PAWN |
|---|---|---|---|---|---|
| | WCN | WN | | | |
| 1. | 0 | 0 | None | 0 Bits | 128 Bits |
| 2. | 0 | 1 | WN | 7 Bits | 135 Bits |
| 3. | 1 | 0 | WCN | 4 Bits | 132 Bits |
| 4. | 1 | 1 | WN,WCN | 8 Bits | 136 Bits |

400

| # | E | $T_C$ | $T_A$ | M |
|---|---|---|---|---|
| 1. | WB | Covert RFID reader | Read Default UID and T-PAWN | Encrypt T-PAWN |
| 2. | WB | Replay Attack | Replay UID, T-PAWN | Unable to replay from fixed location |
| 3. | PA_WB | Radio Interference | Jam Signal | Alarm Triggers |
| 4. | PA_WB | Unauthorized write onto tag | Modify/Wipe T-PAWN | Write Lock for Tag |

700

SYSTEM AND METHOD FOR REAL TIME THEFT DETECTION

CROSS-REFERENCE TO RELATED APPLICATIONS

This application claims the benefit of the filing date of U.S. Provisional Patent Application No. 61/201,598 filed Dec. 12, 2008, the disclosure of which is hereby incorporated herein by reference.

BACKGROUND OF THE INVENTION

The present invention is directed towards automated identification of devices. More particularly, the present invention provides theft detection of portable devices using radio frequency identification.

Portable devices are being widely used for storing, manipulating, and exchanging data. A portable device can be an intelligent or unintelligent device based on the presence or absence of data processing capability in the device. Examples of an intelligent portable device includes, but are not limited to, portable audio player, portable video player, smartphone, mobile phone, laptop, and Personal Digital Assistant (PDA). Further, examples of unintelligent portable device include, but are not limited to, document, wallet, bag, id-card. The portable devices may be expensive in nature and may carry confidential and important data and are therefore prone to theft.

Several technologies exist to detect occurrence of theft of portable devices using Radio Frequency Identification (RFID). For example, in large retail stores, shelf-based anti-theft systems are implemented, where portable products are coupled with RFID tags, whereas RFID readers are placed in doorways and windows of the store. When one or more products are stolen from the store, an RFID reader sends an alert to the Emergency Alert System (EAS) system of the store. However, the shelf-based antitheft system is limited to theft detection of portable devices present in an RFID enabled location. The existing RFID systems do not provide a mechanism of real time theft detection of a portable device carried by a mobile user in a location which is not secured by an RFID system.

Further, technologies exist to detect occurrence of theft of portable devices without using RFID. One such technology is use of anti-theft cables and locks. The security cables and locks provide theft detection for portable devices such as iPods. Another technology includes pairing a wireless device with a mobile phone. When the mobile phone disassociates from the wireless device, the wireless device prompts a user to enter an authentication code, thereby alarming the user regarding separation of the mobile phone. However, the above-mentioned technologies are limited to theft detection of specific devices. These technologies are not applicable to a wide range of intelligent and unintelligent portable devices.

In light of the abovementioned disadvantages, there is a need for a system and method that facilitates real time theft detection of a wide range of portable devices carried by a user. The system and method should act as a deterrent to theft of portable devices and alert a mobile user within fraction of seconds, in case of theft. Further, the method and system should use efficient and low power techniques for real time theft detection and should be applicable to wide variety of intelligent and unintelligent portable devices.

BRIEF SUMMARY OF THE INVENTION

A method for tracking one or more portable devices in real time to detect theft of the one or more portable devices is provided. The method comprises, firstly, interrogating a Radio Frequency Identification (RFID) tag via a RFID reader during successive sweep intervals. The sweep interval represents active state of the RFID reader. Secondly, the method comprises receiving one or more pairing information from the RFID tag. Further, the method comprises comparing the one or more pairing information with corresponding one or more pairing information stored in the RFID reader. Finally, the method comprises generating an alert signal via the wearable-band or the one or more portable devices when the one or more pairing information does not match with the corresponding one or more pairing information stored in the RFID reader. The RFID tag and the RFID reader reside in a wearable-band adapted to be worn by a user and the one or more portable devices respectively or vice versa.

In an embodiment of the present invention, the method further comprises establishing a sleep interval between the successive sweep intervals. The sleep interval represents inactive state of the RFID reader. In another embodiment of the present invention, the method further comprises generating an alert signal via the wearable-band or the one or more portable devices when the RFID tag fails to respond to the RFID reader. In another embodiment of the present invention, receiving the one or more pairing information from the RFID tag comprises, firstly, fetching a unique identifier. The unique identifier corresponds to vendor specific information associated with the RFID reader and the wearable-band. Secondly, the method comprises fetching a unique number allocated to each pair of the one or more portable devices and the wearable-band.

In an embodiment of the present invention, comparing the one or more pairing information with corresponding one or more pairing information stored in the RFID reader comprises, firstly, comparing the unique identifier with the unique identifier stored in the RFID reader. Secondly, the method comprises comparing the unique number associated with the RFID tag with the unique number associated with the RFID reader.

In an embodiment of the present invention, generating an alert signal via the wearable-band or the one or more portable devices further comprises measuring a first time value at the start of the sweep interval. Secondly, the method comprises measuring a second time value when the one or more pairing information does not match with the one or more pairing information stored in the RFID reader. Further, the method comprises calculating a difference between the second time value and the first time value to obtain a third time value. Furthermore, the method comprises comparing the third time value with a predetermined false alarm threshold value. Finally, the method comprises generating an alert signal when the third time value exceeds the predetermined false alarm threshold value.

In an embodiment of the present invention, generating an alert signal via the wearable-band and the RFID reader when any one of the pairing information do not match with the corresponding pairing information stored in the RFID reader comprises at least one of: triggering an alarm system and triggering a visual display system. In another embodiment of the present invention, the method further comprises performing selective error correction using hamming code on the pairing information received from the RFID tag. In another embodiment of the present invention, the method further comprises mapping information related to multiple portable devices with information stored in a lookup table in the wearable-band. The wearable-band comprises multiple RFID tags.

A system for tracking one or more portable devices in real time to detect theft of the one or more portable devices is provided. The system comprises one or more portable devices with processing capability, one or more portable devices without processing capability and a wearable-band adapted to be worn by a user. The one or more portable devices with processing capability comprises a Radio frequency Identification (RFID) reader configured to interrogate a RFID tag residing in the wearable-band during successive sweep intervals. The sweep interval represents active state of the RFID reader. Further, the one or more portable devices without processing capability comprise the RFID tag which is interrogated by the RFID reader residing in the wearable-band during successive sweep intervals.

In an embodiment of the present invention, the one or more portable devices with processing capability comprises any one of: mobile phones, personal digital assistants, laptops, smart phones, digital watch, digital camera, portable audio player, portable video player and any other intelligent device capable of processing. In another embodiment of the present invention, the one or more portable devices without processing capability comprises any one of: wallets, document holders, keys handbags and any other personal item of the user without processing capability.

In an embodiment of the present invention, the one or more portable devices with processing capabilities comprises software modules such as programmable time service, a user interface and a portable device feature control application programming interface to at least facilitate generating an alert to the user. In another embodiment of the present invention, the one or more portable devices with processing capabilities comprises hardware modules such as system bus, memory mapped registers, interrupt line and circuit space on the printed circuit board of the one or more portable devices.

In an embodiment of the present invention, the wearable-band paired with the one or more portable devices with processing capabilities comprises hardware modules such as battery operated alarm circuit integrated with the RFID tag. In another embodiment of the present invention, the wearable-band paired with the one or more portable devices without processing capability comprises a battery for operating the RFID reader, an alarm circuit and a display unit in a user interface of the wearable-band. In an embodiment of the present invention, the wearable-band paired with the one or more portable devices without processing capability comprises software modules such as programmable time service, application programming interfaces to at least facilitate generating an alert to the user employing an alarm circuit and a display unit.

The present invention is described by way of embodiments illustrated in the accompanying drawings wherein:

DETAILED DESCRIPTION

A method and a system for real time theft detection of a portable device are described herein. The present disclosure is more specifically directed towards real time theft detection of a portable device using Radio Frequency Identification (RFID). An exemplary scenario in which the present invention may be implemented is a user carrying one or more intelligent/unintelligent portable devices. The user is provided with a wearable band which includes a battery operated alarm circuit. The alarm circuit sounds an alarm when at least one portable device moves out of range of the wearable band.

In an embodiment of the present invention, the system and method disclosed provides an Intelligent Artifact Model (IAM) for intelligent portable devices. In IAM model, RF reader is coupled to the portable device and Radio Frequency (RF) tag is coupled to wearable band.

In another embodiment of the present invention, the system and method disclosed provides an Unintelligent Artifact Model (UAM) for unintelligent portable devices. In UAM model, RF tag is coupled to the portable device and RF reader is coupled to wearable band.

In various embodiments of the present invention, the system and method enables real time theft detection of portable devices carried by a user. The present invention facilitates alerting a user within fraction of seconds in case of a theft.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
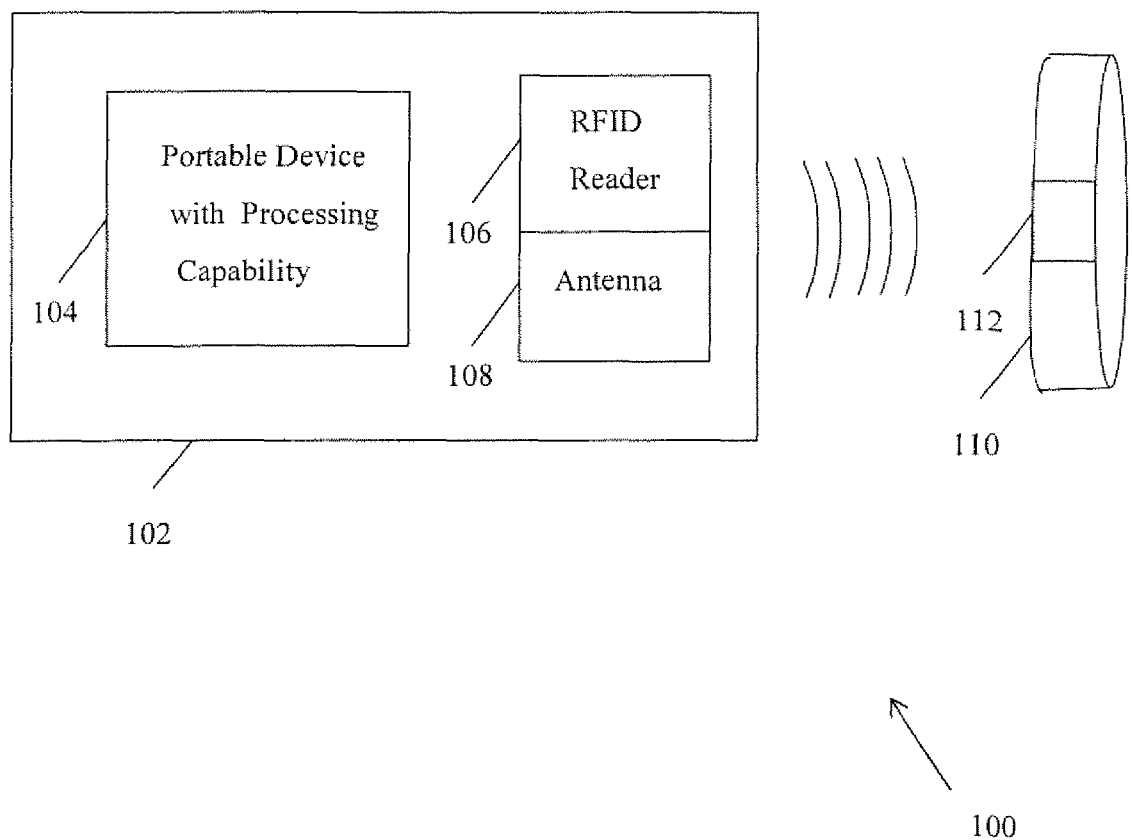
FIG. 1 illustrates a system for theft detection of a portable device with processing capability using RFID communication.

FIG. 1 illustrates a system 100 for theft detection of a portable device with processing capability using RFID communication. A portable device is a device used by a user for a specific functionality or multiple functionalities. A portable device may be intelligent or unintelligent depending upon the presence or absence of processing capability. Examples of portable devices include, but are not limited to, digital watch, mobile phones, digital camera, smart phones, wallets, document holders and smartphones.

In an embodiment of the present invention, the system 100 comprises an enclosure 102 comprising a portable device with processing capability 104 and an RFID reader 106 with an antenna 108. Examples of a portable device with processing capability may be electronic devices such as mobile phones, PDA's, laptops, digital watch, smartphones and the like. These devices have an internal capability for processing information. An RFID reader is a device that tracks objects by emitting radio signals using an antenna. The radio signals scan and detect an RFID tag which is coupled to an object to be tracked. An RFID tag is a microchip with an antenna which picks up the radio signals transmitted by the RFID reader and returns additional data back to the reader that is used for identification. The system 100 comprises a wearable-band 110 hosting an RFID tag 112. In various embodiments of the present invention, the wearable-band 110 can be custom-made to fit on arm, neck or waist of a user of the portable device 104.

The RFID reader 106 and the RFID tag 112 on the wearable-band 110 operate in a given frequency range. An example of the frequency range of operation is <=13.56 MHz. In an embodiment of the present invention, the relationship between strength of signal between the RFID reader 106 and the RFID tag 112 is as follows:

$$S' = S \times F(d); F(d) = \begin{cases} \frac{1}{d^6}; & \text{Near Field Signal} \\ \frac{1}{d^2}; & \text{Far Field Signal} \end{cases}$$

wherein the symbols have the following meaning:
S'=Signal strength at point of reference
S=Signal strength at point of origin
D=Distance
F (d)=Function of distance In various embodiments of the present invention, hardware provisions may be required in the portable device 104 and the wearable-band 110. Examples of provisions in the portable device 104 include, but are not limited to, presence on the system bus, memory mapped registers, interrupt line, circuit space on existing printed circuit board and the like. Examples of provisions in the wearable-band 110 include, but are not limited to, a battery operated alarm circuit integrated with the tag.

The RFID reader 106 interrogates the tag on the wearable-band 110 for short time period and then sleeps. These intervals may be called as a Sweep Interval ($T_{SWI}$) and a Sleep Interval ($T_{SLI}$) respectively. In an embodiment of the present invention, if the portable device 104 is not found in the vicinity of the wearable-band 110 during $T_{SWT}$, pertinent actions may be taken on the portable device 104 or the wearable-band 110 to inform a user of the portable device 104. In an example, a pertinent action may include setting off the alarm in an alarm circuit integrated with the RFID tag 112 of the wearable-band 110. In various embodiments of the present invention, software provisions required in the portable device 104 for taking a pertinent action may include, but are not limited to, a programmable time service, an application programming interface or firmware for controlling the features of the portable device 104 and a pertinent user interface.

In various embodiments of the present invention, multiple portable devices may be protected by providing multiple tags in the wearable-band 110. The tracking of the multiple portable devices may be done by storing a lookup table in the wearable-band software for mapping device models with the wearable-band 110.

Figure 2:
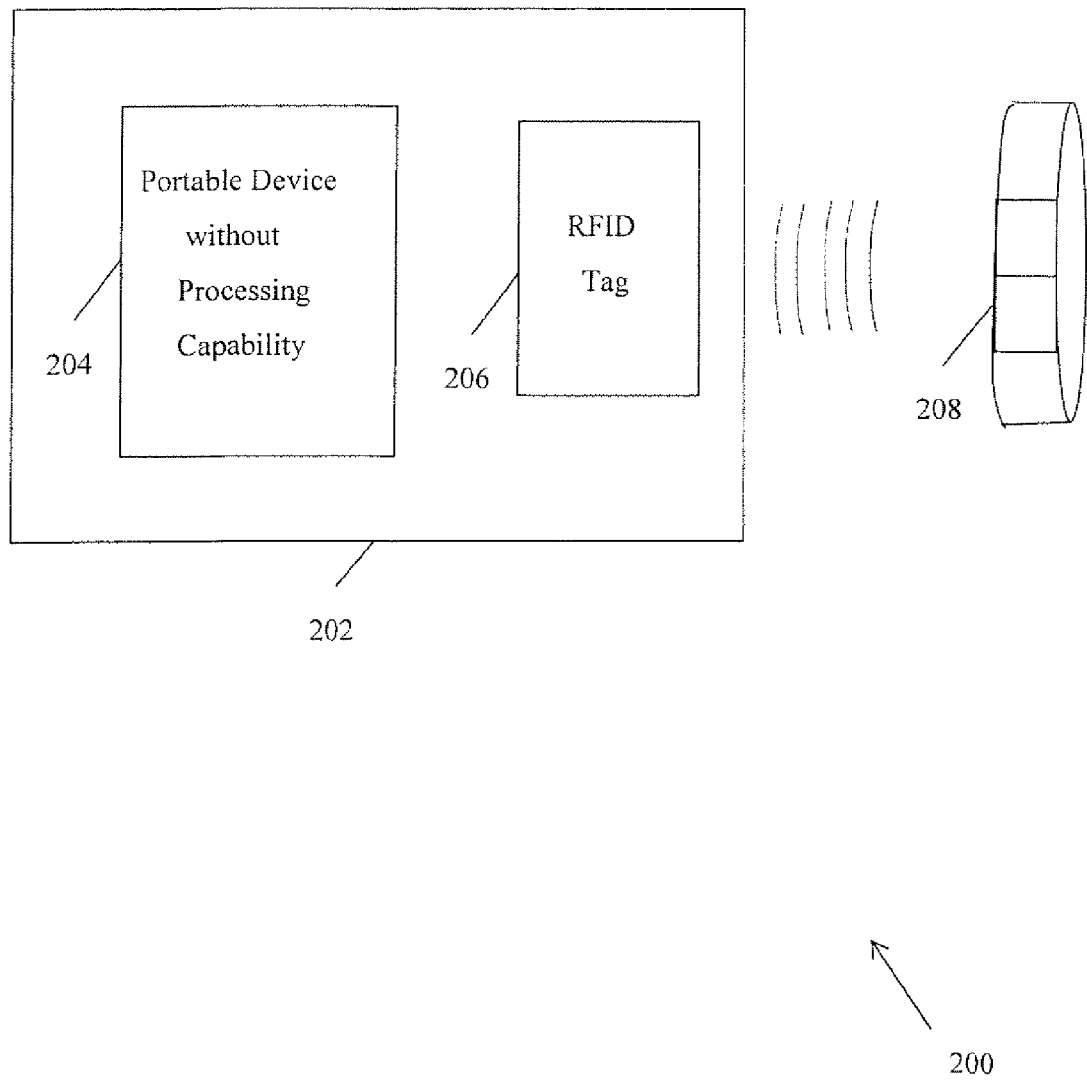
FIG. 2 illustrates a system for theft detection of a portable device without processing capability using RFID communication.

FIG. 2 illustrates a system 200 for theft detection of a portable device without processing capability using RFID communication. In an embodiment of the present invention, the system 200 comprises an enclosure 202 comprising a portable device without processing capability 204 and an RFID tag 206. Examples of a portable device without processing capability may include, but are not limited to, devices such as wallets, keys, handbags, watches or personal items used by a user which do not have an internal capability for processing information. The system 200 further comprises a wearable-band 208 hosting an RFID reader and an alarm circuit. The wearable-band 208 can be custom-made to fit on arm, neck or waist of a user of the portable device 204. In an embodiment of the present invention, the RFID tag 206 is a microchip with an antenna which picks up the radio signals transmitted by the RFID reader in the wearable-band 208 and returns additional data back to the RFID reader that is used for identification.

The RFID reader in the wearable-band 208 interrogates the RFID tag 206 for short time period and then sleeps. These intervals may be called a Sweep Interval ($T_{SWI}$) and a Sleep Interval ($T_{SLI}$) respectively. In an embodiment of the present invention, if the portable device 204 is not found in the vicinity of the wearable-band 208 during $T_{SWT}$, pertinent actions may be taken on the wearable-band 208 to inform a user of the portable device 204. In an example, a pertinent action may include setting off the alarm in an alarm circuit integrated with the wearable-band 208. In another example, a pertinent action may be alerting the user of the portable device 204 by a visual display in the wearable-band 208.

In various embodiments of the present invention, additional hardware and software provisions are included in the system 200 for proper operation of theft-detection. The provisions include, but are not limited to, providing on the wearable-band 208, a battery operated reader and alarm circuit, a display unit in the user interface of the wearable-band 208, a programmable time service and an application programming interface or firmware for controlling the features of the wearable-band 208.

Figure 3:
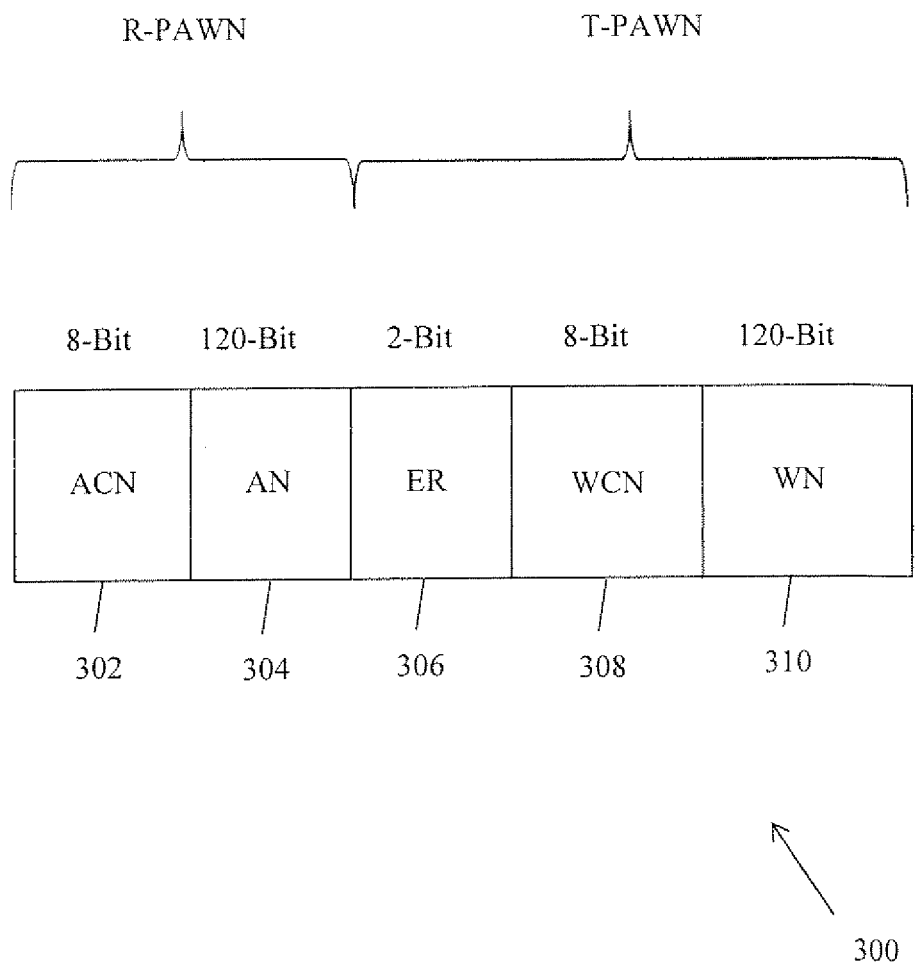
FIG. 3 illustrates packet format of a portable device wearable-band number used to associate a portable device with a wearable-band.

FIG. 3 illustrates a packet format 300 of a portable device wearable-band number used to associate a portable device with a wearable-band. In an embodiment of the present invention, a portable device is identified and associated with a wearable-band and vice-versa for theft-detection by a unique number. In an example, a unique number is allocated to each (portable device, wearable-band) pair. An exemplary format for associating a portable device with a wearable-band is (R-PAWN, T-PAWN) Instance, where
PAWN is Portable Artifact Wearable band Number
R-PAWN is Reader-PAWN; and
T-PAWN is Tag-PAWN. R-PAWN is stored on the RFID reader and T-PAWN is stored on the RFID tag. During each $T_{SWT}$, the RFID reader fetches T-PAWN and compares with R-PAWN and takes pertinent actions upon mismatch.

In various embodiments of the present invention, in order to facilitate large number of pairs of portable artifacts and wearable-bands, sufficient bit-width is allocated to R-PAWN and T-PAWN. As shown in the figure, the packet format for the (R-PAWN, T-PAWN) combination includes the following an Artifact Class Number (ACN) 302, an Artifact Number (AN) 304, an Error Resilience (ER) 306, a wearable-band class number (WCN) 308 and a wearable-band number (WN) 310. The ACN number 302 is an 8-bit number used to accommodate various classes of portable artifacts. The AN number 304 is a 120-bit number used to uniquely identify a portable artifact per portable artifact class. The ER 306 is a 2-bit number used for selective error correction mechanism. The WCN 308 is an 8-bit number used to accommodate various classes of wearable-band corresponding to various classes of portable artifacts. The WN 310 is a 120-bit number used to uniquely identify a given wearable-band per wearable-band class.

Figure 4:
FIG. 4 illustrates a table depicting T-PAWN fields protected by selective error correcting mechanism.

FIG. 4 illustrates a table 400 depicting T-PAWN fields protected by selective error correcting mechanism. In an embodiment of the present invention, during reading of T-PAWN, intentional or unintentional interference may cause the data to get corrupted. The method of the invention includes an error correction mechanism to counter such an interference. In an embodiment of the present invention, a selective error correction mechanism using hamming code is proposed. As shown in the figure, the total allocated error correction bits are the optimal number of error correction bits required for appropriate bits of information. Further, the size of T-PAWN varies depending upon the configuration of ER bits. The algorithm for selective error correction mechanism is given as follows:

1. If ER=0 then RETURN
2. If ER=1 then
   Perform ERROR_CORRECTION_ON_WN
3. If ER=2 then
   Perform ERROR_CORRECTION_ON_WCN
4. If ER=3 then
   Perform    ERROR_CORRECTION_ON_WN_AND_WCN
5. Stop In an embodiment of the present invention, when the reader fetches the T-PAWN from the RFID tag and decodes the ER bit of the packet, various error correction bits are discarded after the error correction operation is over. In an example, if (ER=0), the bit positions used for error correction as per hamming code are not treated as hamming bits and are neglected.

Figure 5:
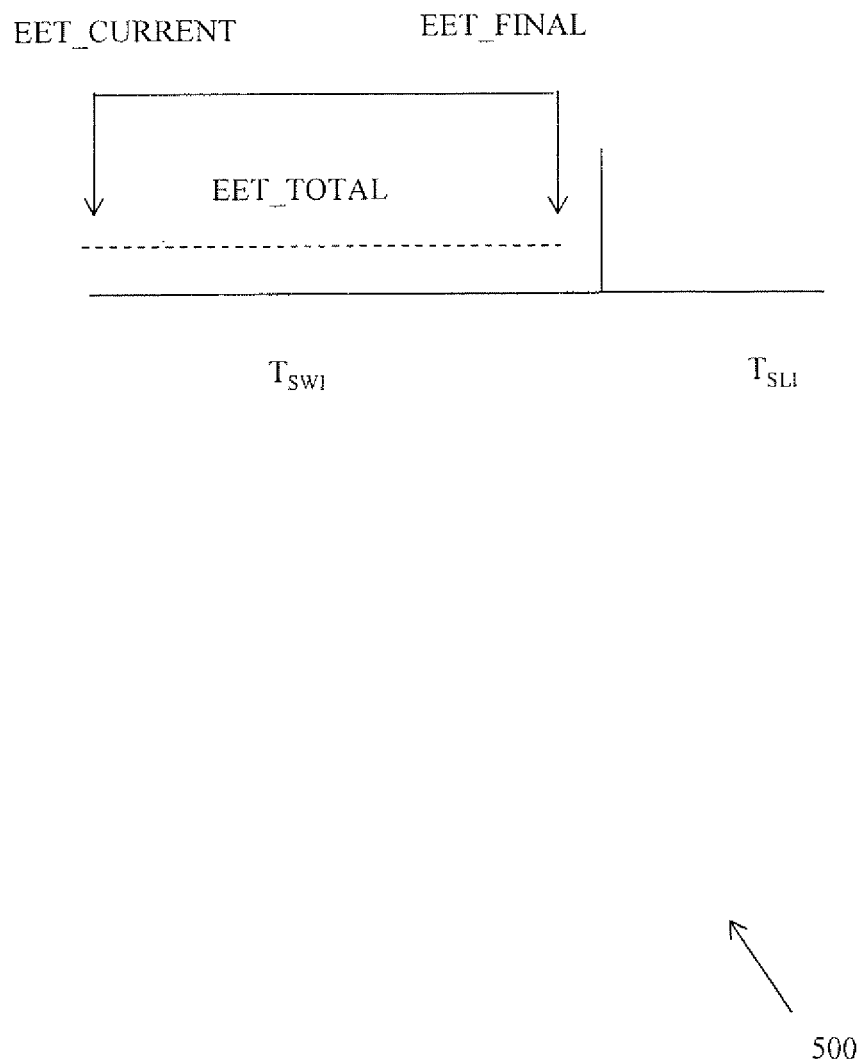
FIG. 5 illustrates an alternating time mode to distinguish between sweep and sleep intervals, which balance theft detection and power consumption on the portable device.

FIG. 5 illustrates a waveform 500 detection of theft condition based on time measurements. In various embodiments of the present invention, real time theft detection of a portable device uses the following algorithm:

EET: Entry-Exit Timer
EET_CURRENT ← CURRENT_TIME

Theft-evident algorithm:
1. RFID_READER_WAKEUP ← TRUE, P ← FALSE
2. Start $T_{SWT}$, Start EET
   2. a. Interrogate RFID tag on wearable-band/portable artifact side depending upon system model
   2. b. Read default UID
   2. c. If default UID = stored UID then P ← TRUE
   2. d. Read T-PAWN
   2. e. Perform SELECTIVE_ERROR_CORRECTION
   2. f. If T-PAWN: R-PAWN then P ← FALSE
   2. g. If TIMER_OVER {$T_{SWT}$} then
      2. g. 1. RFID_READER_WAKEUP ← FALSE
      2. g. 2. SLEEP {$T_{SLI}$}
      else CONTINUE
3. If P ← FALSE then perform FTE_CHECK
   else
   3. a. If TIMER_OVER {$T_{SWT}$} then
      3. a. 1. RFID_READER_WAKEUP ← FALSE
      3. a. 2. SLEEP {$T_{SLI}$}
      else CONTINUE
4. Stop $T_{SWT}$, Stop EET
FTE_CHECK: False Theft Evidence Check
1. EET_FINAL ← CURRENT_TIME (Time elapsed)
2. EET_TOTAL = (EET_FINAL − EET_CURRENT)
3. If EET_TOTAL ≥ FAT Then
   3. a. perform USER_SPECIFIC_ACTIONS
   else
   3. b. perform NO OP, P ← TRUE
4. Return According to the above algorithm, an RFID reader sleeps for duration of $T_{SLI}$ between two $T_{SWT}$. When the RFID reader wakes up, it tries to fetch default UID stored in the RFID tag. If the reader is able to read the default UID then the P (or Proximity) flag is set to TRUE else it remains FALSE. In an example, If P flag is set to TRUE then, the reader fetches T-PAWN and compares with R-PAWN. If both are equal, then reader goes back to sleep else a theft condition is marked. In another example, If P flag is set to FALSE, then FTE_CHECK (or False Theft Evidence Check) is called else reader goes back to sleep after finishing $T_{SWT}$. This theft condition is the credible evidence of occurrence of theft, given that the false positive remains minimal due to selective error correction mechanism.

As shown in the figure, EET_CURRENT is obtained at the start of $T_{SWT}$ and the EET_FINAL is measured when the theft condition is marked, the difference of two time values, EET_TOTAL is then compared to a FAT (or False Alarm Threshold) value. In an example, If EET_TOTAL exceeds the FAT value then it indicates that the wearable-band has remained outside the region of interest for a time period greater than the FAT value. Consequently, this indicates that the permissible false alarm threshold has been surpassed. In an embodiment of the present invention, the RFID tag has a default UID which is stored in non-erasable area of memory. This facilitates in countering replay attacks, wherein the attacker may be able to capture all static data from the RFID tag by way of interrogating the tag on portable device or wearable-band side, but will not be able to replay the default UID from a particular location of memory using a rogue tag. In an example, UID containing additional vendor specific information combined with requirement of fetching data from particular memory location can be used as deterrence against such attacks.

Figure 6:
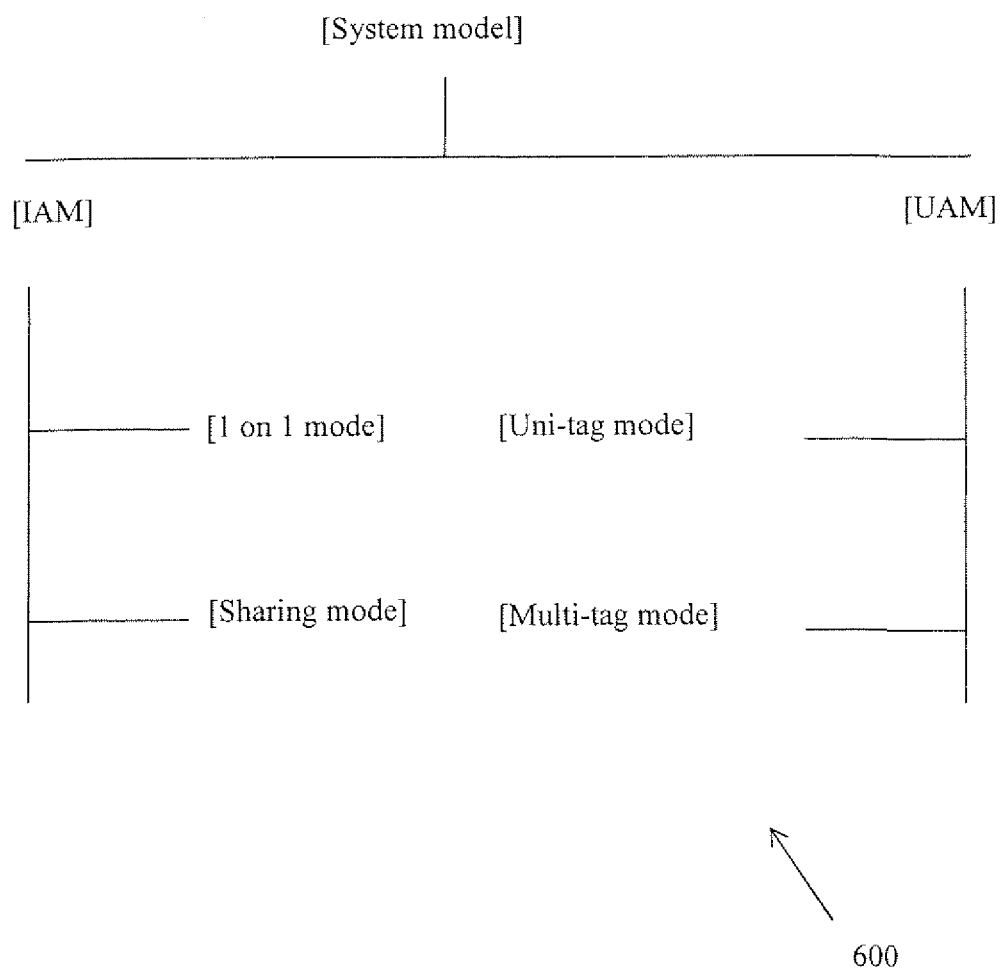
FIG. 6 illustrates a system model of the theft detection system enumerating the modes of operation of the theft-detection system.

FIG. 6 illustrates a system model 600 of the theft-detection system enumerating the modes of operation of the theft-detection system. In an embodiment of the present invention, depending upon the model (IAM or UAM) of the theft-detection system, the system model can be extended to work with multitude of portable artifacts by way of the following operation modes: In 1-on-1 mode, every portable artifact has its own wearable-band. Consequently, only one portable artifact is affected by theft condition. In sharing mode, a number of $Q=\{q_1, q_2 \ldots q_{10}\}$ $\Sigma=\{e_1, e_2 \ldots e_{15}\}$ $F=\{\ \}$ The transition function description is given in tabular form as:

| [State, Input] | $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ |
|---|---|---|---|---|---|---|---|---|---|---|---|---|---|---|---|
| $q_1$ | ∅ | $q_2$ | ∅ | ∅ | ∅ | ∅ | ∅ | ∅ | ∅ | ∅ | ∅ | ∅ | ∅ | ∅ | ∅ |
| $q_2$ | ∅ | ∅ | $q_3$ | ∅ | ∅ | ∅ | ∅ | ∅ | ∅ | ∅ | ∅ | ∅ | ∅ | ∅ | ∅ |
| $q_3$ | ∅ | ∅ | ∅ | $q_3$ | $q_4$ | ∅ | ∅ | ∅ | ∅ | ∅ | ∅ | ∅ | ∅ | ∅ | ∅ |
| $q_4$ | ∅ | ∅ | ∅ | ∅ | ∅ | $q_5$ | ∅ | ∅ | ∅ | ∅ | ∅ | ∅ | ∅ | ∅ | ∅ |
| $q_5$ | ∅ | ∅ | ∅ | ∅ | ∅ | ∅ | $q_6$ | ∅ | ∅ | ∅ | ∅ | ∅ | ∅ | ∅ | ∅ |
| $q_6$ | ∅ | ∅ | ∅ | ∅ | ∅ | ∅ | ∅ | $q_6$ | $q_7$ | ∅ | ∅ | ∅ | ∅ | ∅ | ∅ |
| $q_7$ | ∅ | ∅ | ∅ | ∅ | ∅ | ∅ | ∅ | ∅ | ∅ | $q_8$ | ∅ | $q_9$ | ∅ | ∅ | ∅ |
| $q_8$ | ∅ | ∅ | ∅ | ∅ | ∅ | ∅ | ∅ | ∅ | ∅ | ∅ | $q_1$ | ∅ | ∅ | ∅ | ∅ |
| $q_9$ | ∅ | ∅ | ∅ | ∅ | ∅ | ∅ | ∅ | ∅ | ∅ | ∅ | ∅ | ∅ | $q_7$ | $q_{10}$ | ∅ |
| $q_{10}$ | ∅ | ∅ | ∅ | ∅ | ∅ | ∅ | ∅ | ∅ | ∅ | ∅ | ∅ | ∅ | ∅ | ∅ | $q_1$ |
| $q_{start}$ | $q_1$ | ∅ | ∅ | ∅ | ∅ | ∅ | ∅ | ∅ | ∅ | ∅ | ∅ | ∅ | ∅ | ∅ | ∅ |

Figure 7:
FIG. 7 illustrates a threat model of the theft detection system.

Input alphabet set contains events, each of which is set. The description of event is given as:

$e_1$ = {RFID_READER_WAKEUP → TRUE, P → FALSE}
$e_2$ = {Start $T_{SWI}$, Start EET}
$e_3$ = {Read default UID}
$e_4$ = {Default UID ≠ Stored UID}
$e_5$ = {Default UID = Stored UID, P → TRUE}
$e_6$ = {Read T-PAWN}
$e_7$ = {Perform SELECTIVE_ERROR_CORRECTION}
$e_8$ = {T-PAWN ≠ R-PAWN}
$e_9$ = {T-PAWN ≠ R-PAWN, P → FALSE}
$e_{10}$ = {TIMER_NOT_OVER($T_{SWI}$)}
$e_{11}$ = {TIMER_OVER($T_{SWI}$), RFID_READER_WAKEUP → FALSE, SLEEP}
$e_{12}$ = {CONTINUE}
$e_{13}$ = {P → TRUE}
$e_{14}$ = {P → FALSE, Perform FTE_CHECK}
$e_{15}$ = {REPEAT} portable artifacts (with each storing default UID and T-PAWN of wearable band in persistent memory). Consequently, all the portable artifacts are affected by theft condition. Uni-tag mode operates like 1-on-1 mode and Multi-tag mode operates like sharing operation mode FIG. 7 illustrates a threat model 700 of the theft-detection system. In an embodiment of the present invention, a threat is a set of actions taking place on entities in the system model, i.e. the portable artifact (PA) and the wearable-band (WB) which may affect the functioning of the theft-detection system. Mitigation actions are provided in the theft-detection system to counter such threats. The threat model can be described as follows:

$TM=(E,T_C,T_A,M)$

The symbols have the following meaning: TM=Threat Model, E=Entity (PA or WB), $T_C$=Threat Condition, $T_A$=Threat Action and M=Mitigation Action. The valid threats and corresponding mitigation actions are detailed in the table in the FIG. 7. In an example, if the threat condition is a radio interference in portable device, the corresponding threat action may be a jam signal causing the interference and the corresponding mitigation action may be triggering the alarm by the system.

Figure 8:
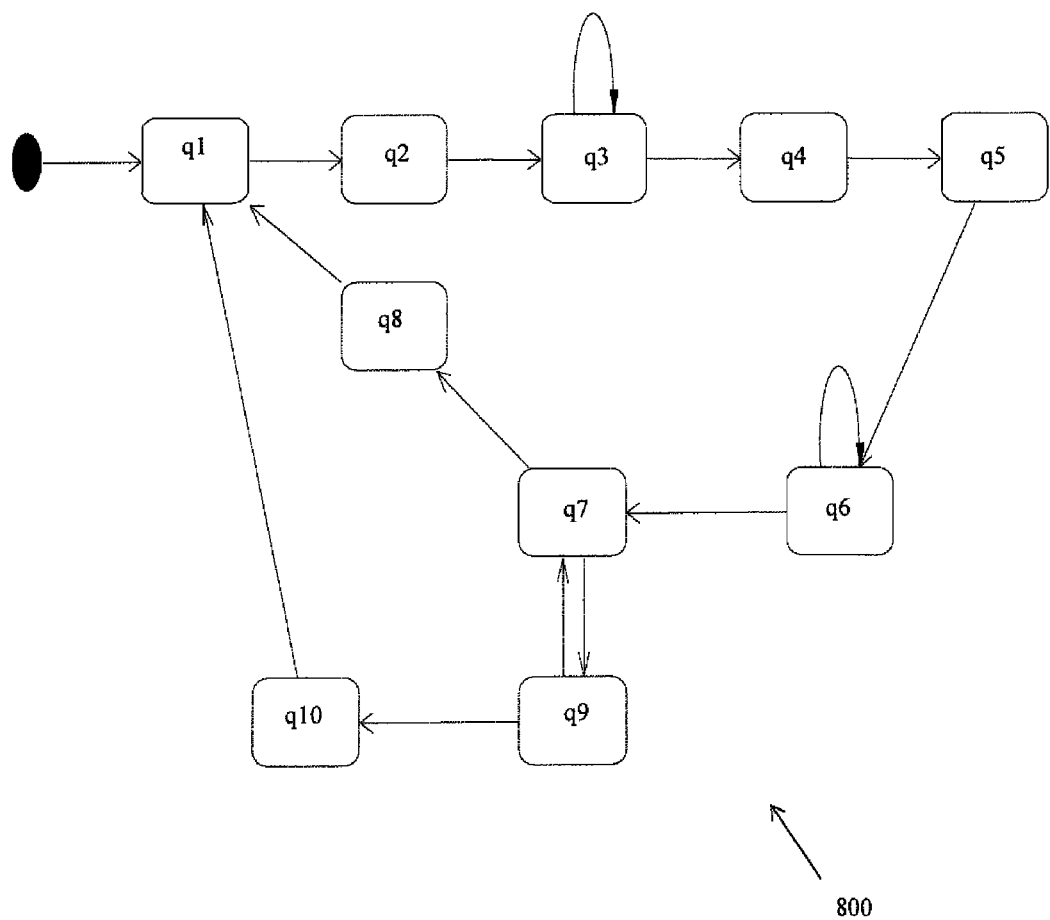
FIG. 8 illustrates a finite state machine for implementing the real time theft detection algorithm.
Figure 9:
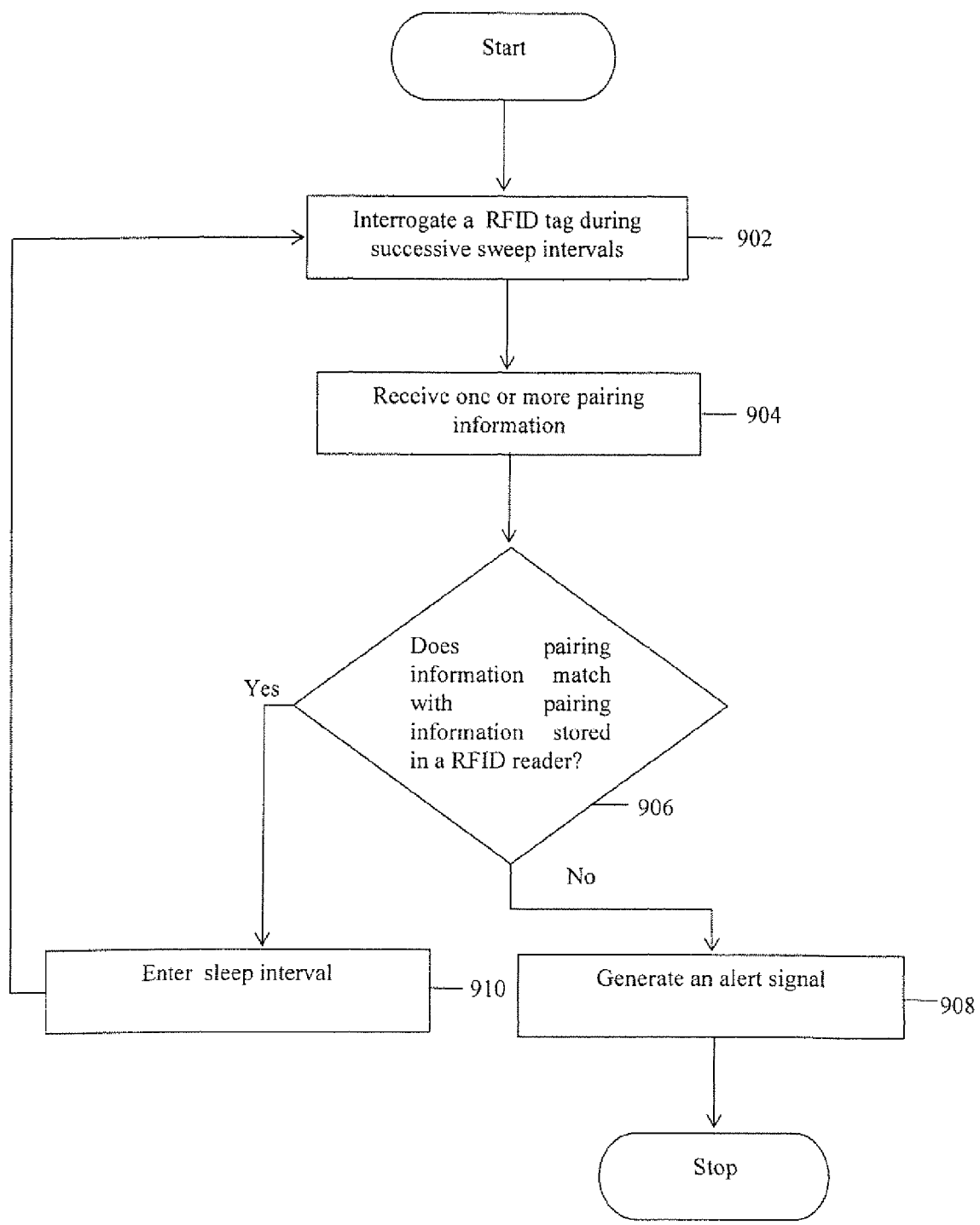
FIG. 9 illustrates a flowchart depicting a method for tracking one or portable devices in real time to detect theft in accordance with an embodiment of the present invention.

FIG. 8 illustrates a finite state machine 800 for implementing the real time theft detection algorithm. In an embodiment of the present invention, the formal description of finite state machine is given as follows: $M=(Q,\Sigma,\delta,q_{start},F)$, where the symbols have the following meaning: M=Machine description set, Q=Finite set of states, $\Sigma$=Input alphabet, $\delta$=Transition function: $Q\times\Sigma\rightarrow Q$, $q_{start}$=Start State, F=Finite set of states. In an example, the set members of the aforementioned sets are:

FIG. 9 illustrates a flowchart depicting a method for tracking one or portable devices in real time to detect theft in accordance with an embodiment of the present invention.

At step 902, a RFID tag is interrogated during successive sleep intervals. In various embodiments of the present invention, the RFID tag is interrogated by a RFID reader. The RFID reader is configured to interrogate the RFID tag for a short preset time period i.e. sweep interval. The RFID reader interrogates the RFID tag to fetch information related to the one or more portable devices and corresponding wearable-band pair. The wearable-band is adapted to be worn by user of the portable devices.

At step 904, one or more pairing information is received. In various embodiments of the present invention, one or more pairing information are allocated to each pair of the one or more portable devices and wearable-band to uniquely identify a portable device with a wearable-band and vice versa. In an embodiment of the present invention, the one or more pairing information may include a unique identifier e.g. a User Identification (UID) which corresponds to vendor specific information associated with RFID reader and the wearable-band. In another embodiment of the present invention, the one or more pairing information may include a unique number that is allocated to each portable device wearable-band pair. In an exemplary embodiment of the present invention, the unique number allocated to the RFID reader may be referred as Reader Portable Artifact and Wearable-Band number (R-PAWN). In another exemplary embodiment of the present invention, the unique number allocated to the RFID tag may be referred as Tag Portable Artifact and Wearable Band number (T-PAWN).

At step 906, a check is performed to determine if the pairing information matches with pairing information stored in the RFID reader. In an embodiment of the present invention, the UID received from the RFID tag is compared with UID stored in the RFID reader. In another embodiment of the present invention, the T-PAWN received from the RFID tag is compared with the R-PAWN stored in the RFID reader.

At step 908, if it is determined that the one or more pairing information does not match to the one or more corresponding information, an alert signal is generated. In various embodiments of the present invention, if the UID received from the RFID tag matches with the UID stored in the RFID reader, the T-PAWN is fetched from the RFID tag. The T-PAWN is then compared with the R-PAWN stored in the RFID reader. In case the T-PAWN does not match with the R-PAWN an alert signal is generated. In an embodiment of the present invention, alert signal is generated by triggering an alarm system in the wearable-band or by displaying theft information in a display unit provided in the wearable-band or provided in a portable device with processing capability.

In another embodiment of the present invention, an alert signal is generated via the wearable-band or the one or more portable devices when the RFID tag fails to respond to the RFID reader. In a further embodiment of the present invention, a check is performed to ensure that a false alarm is not triggered. When the RFID tag fails to respond to the interrogation signal emitted by the RFID receiver, a first time value is measured at the start of the sweep interval. Further, when the one or more pairing information does not match with the one or more pairing information stored in the RFID reader, a second time interval is measured. A difference is then calculated between the second time value and the first time value to obtain a third time value. The third time value is compared with a predetermined false alarm threshold value. If the third value exceeds the predetermined false alarm threshold, an alert signal is generated.

If it is determined that the one or more pairing information matches with the one or more corresponding information, then, at step 910, the RFID reader enters into a sleep interval. In various embodiments of the present invention, a sleep interval is established between successive sweep intervals. The sleep interval represents inactive state of the RFID reader. Steps 902 to 910 are then repeated.

Figure 10:
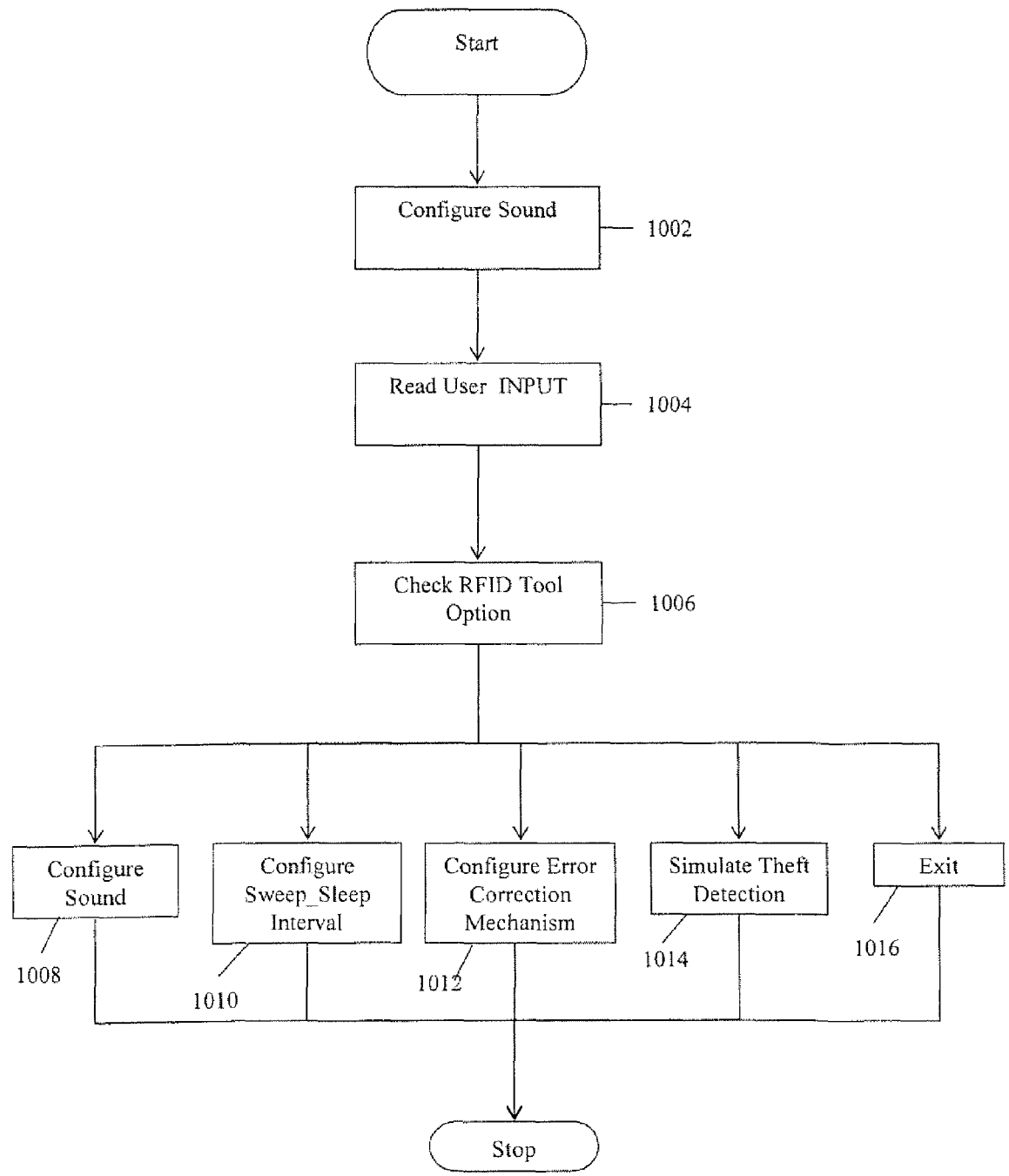
FIG. 10 illustrates a flowchart depicting an RFID tool menu system available to a user of a portable device.

FIG. 10 illustrates a flowchart depicting an RFID tool menu system available to a user of a portable device, in an embodiment of the present invention. The steps of the flowchart are as follows: At step 1002, an RFID tool menu is shown to a user of the portable device. Thereafter, at step 1004, the user input is read and based on the user input an RFID tool option is selected at step 1006 based on the available RFID tool options. The available RFID tool options as shown in the figure are: configure sound, configure sweep and sleep interval, configure error correction mechanism, simulate theft condition and exit.

Figure 11:
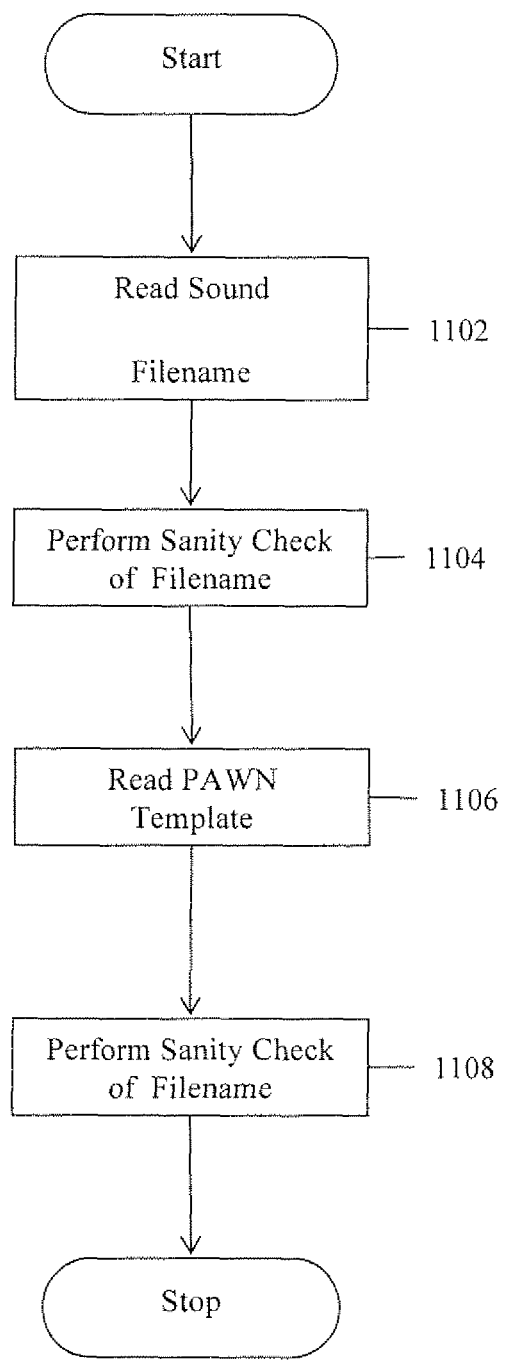
FIG. 11 illustrates a flowchart depicting configuration of sound file and PAWN UID template by the theft detection system.

FIG. 11 illustrates a flowchart depicting configuration of sound file and PAWN UID template by the theft detection system. The steps of the flowchart are as follows: At step 1102 a sound filename entered by a user is read by the system. Thereafter, at step 1104 a sanity check is performed on the sound filename. For configuring the PAWN template, at step 1106, a PAWN template is read by the system and a sanity check for the same is performed at step 1108.

Figure 12:
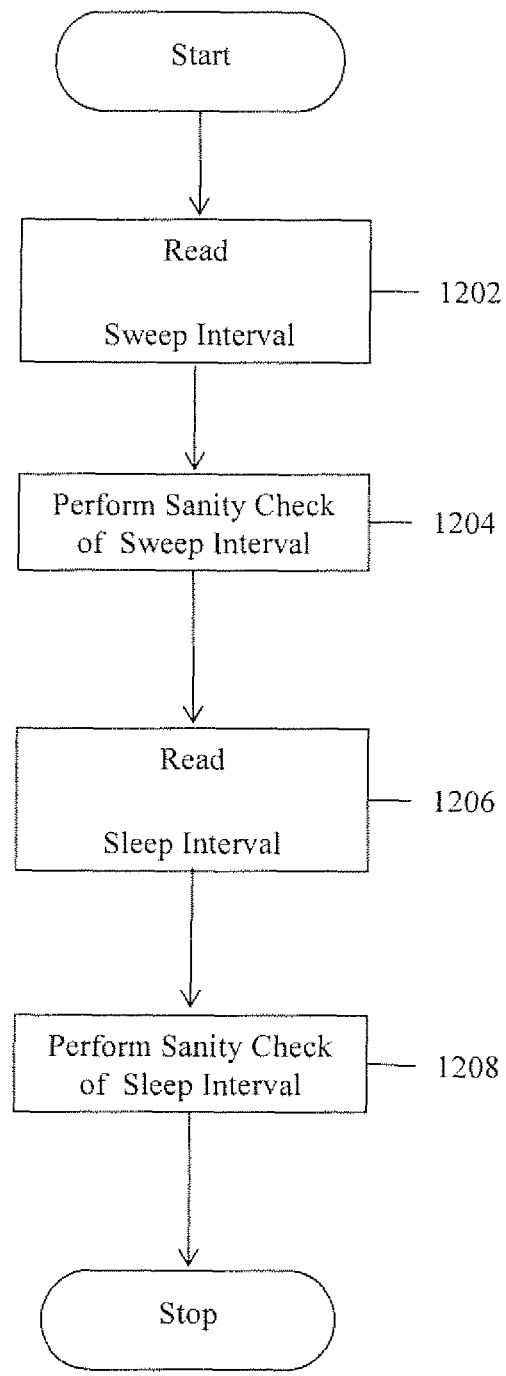
FIG. 12 illustrates a flowchart depicting configuration of sleep and sweep intervals by the theft detection system.

FIG. 12 illustrates a flowchart depicting configuration of sleep and sweep intervals by the theft detection system. The steps of the flowchart are as follows: At step 1202, a value of sweep interval entered by a user is read by the system. Thereafter, at step 1204, a sanity check is performed on the value of the sweep interval to ensure for correctness. For configuring the sleep interval, at step 1206, a value of sleep interval entered by the user is then read and at step 1208, a sanity check for the sleep interval is performed.

Figure 13:
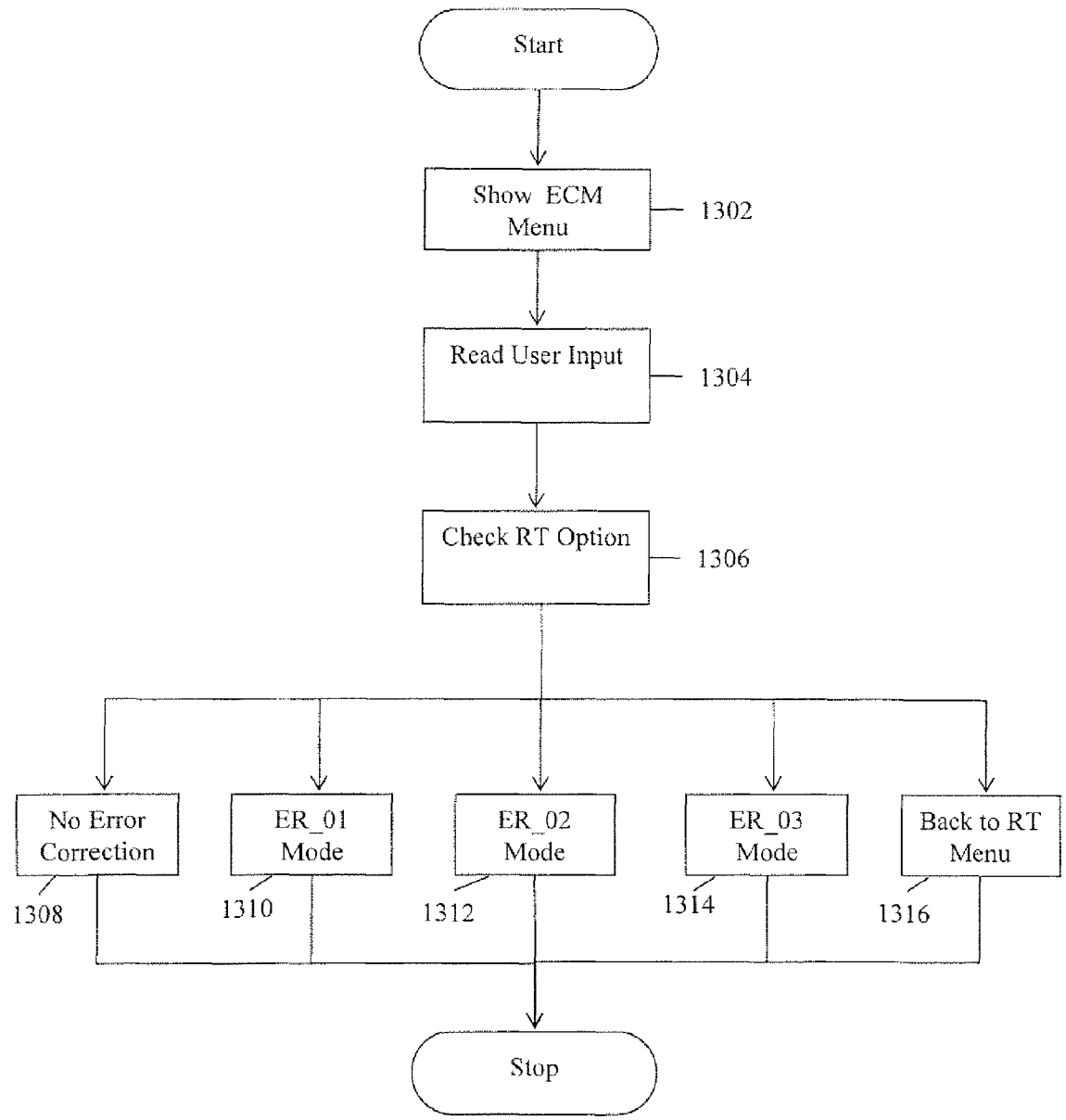
FIG. 13 illustrates a flowchart depicting configuration of error correction mechanism by the theft detection system.

FIG. 13 illustrates a flowchart depicting configuration of error correction mechanism by the theft detection system. The steps of the flowchart are as follows: At step 1302, an error correction mechanism menu is displayed to a user. Upon receiving the user input at step 1304, the available options of error correction are checked at step 1306 and an appropriate option is then selected. In an embodiment of the present invention, the available error corrections options are: No error correction 1308, ER_1 mode 1310, ER_02 mode 1312, ER_03 mode 1314 and back to RFID tool menu 1316. In an embodiment of the present invention, the modes ER_01, ER_02 and ER_03 are respectively, the following fields saved by error correction: WN, WCN and WN, WCN.

Figure 14:
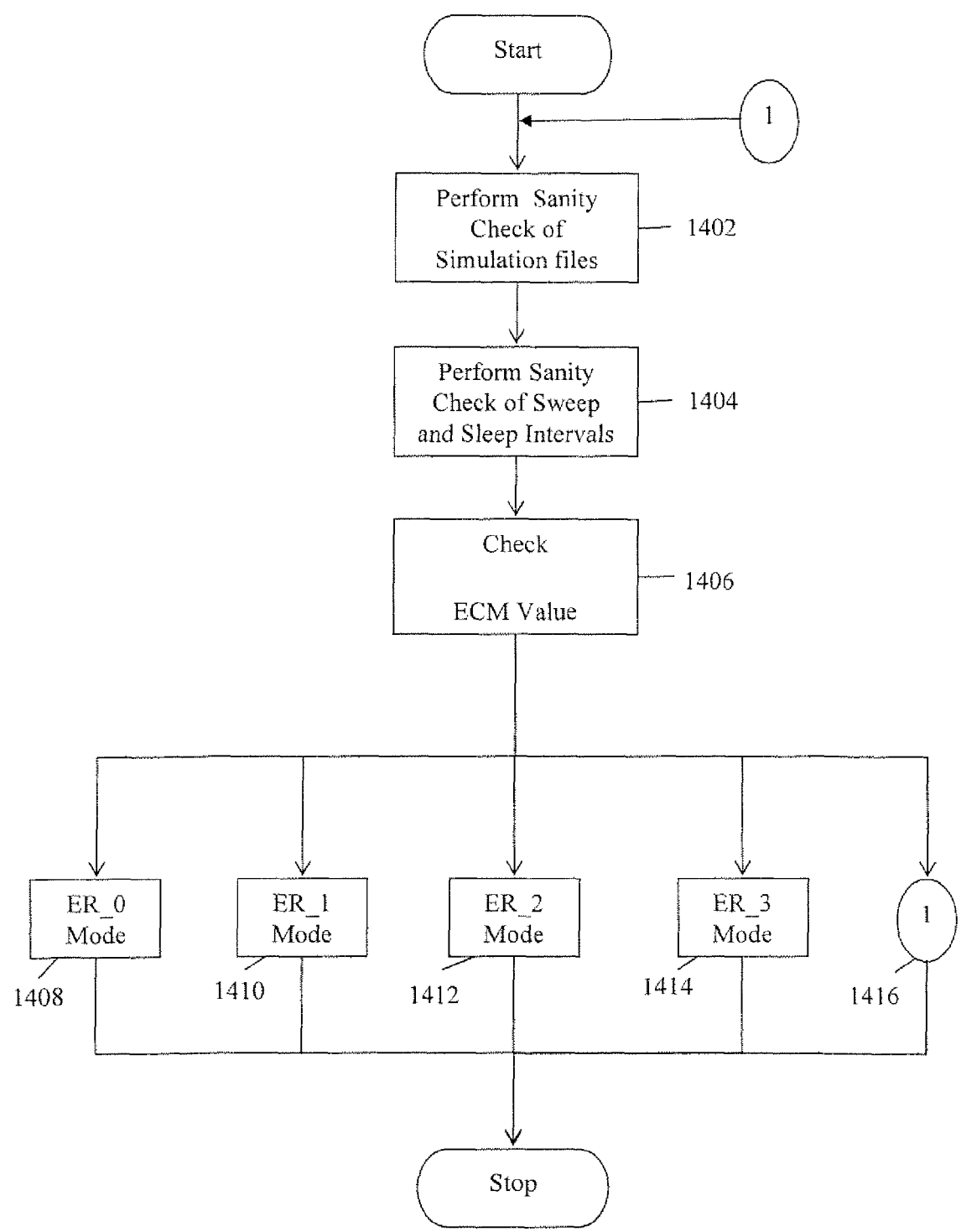
FIG. 14 illustrates a flowchart depicting simulation of theft condition by the RFID tool system.
Figure 15A:
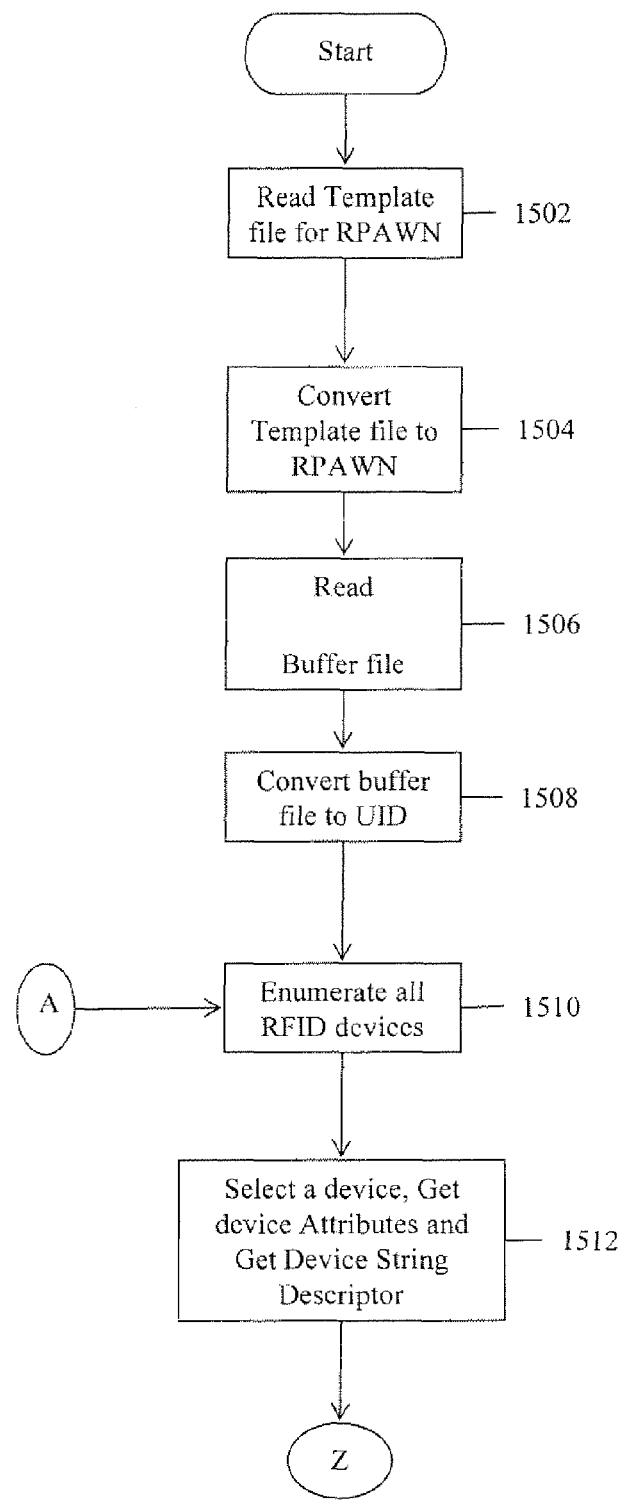
FIGS. 15a, 15b, 15c and 15d illustrate a flowchart depicting performing a theft condition by the RFID tool system.
Figure 15B:
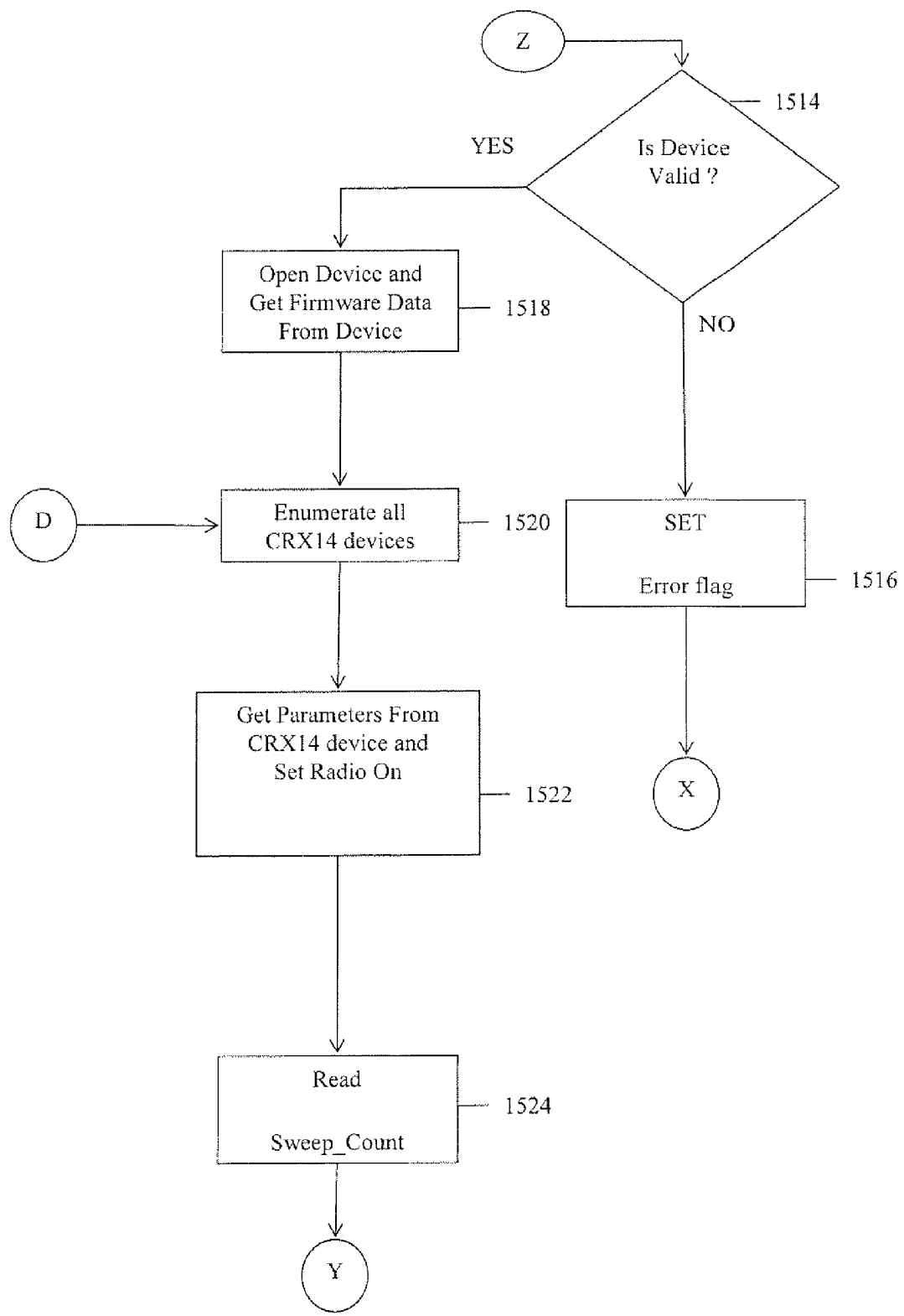
Figure 15C:
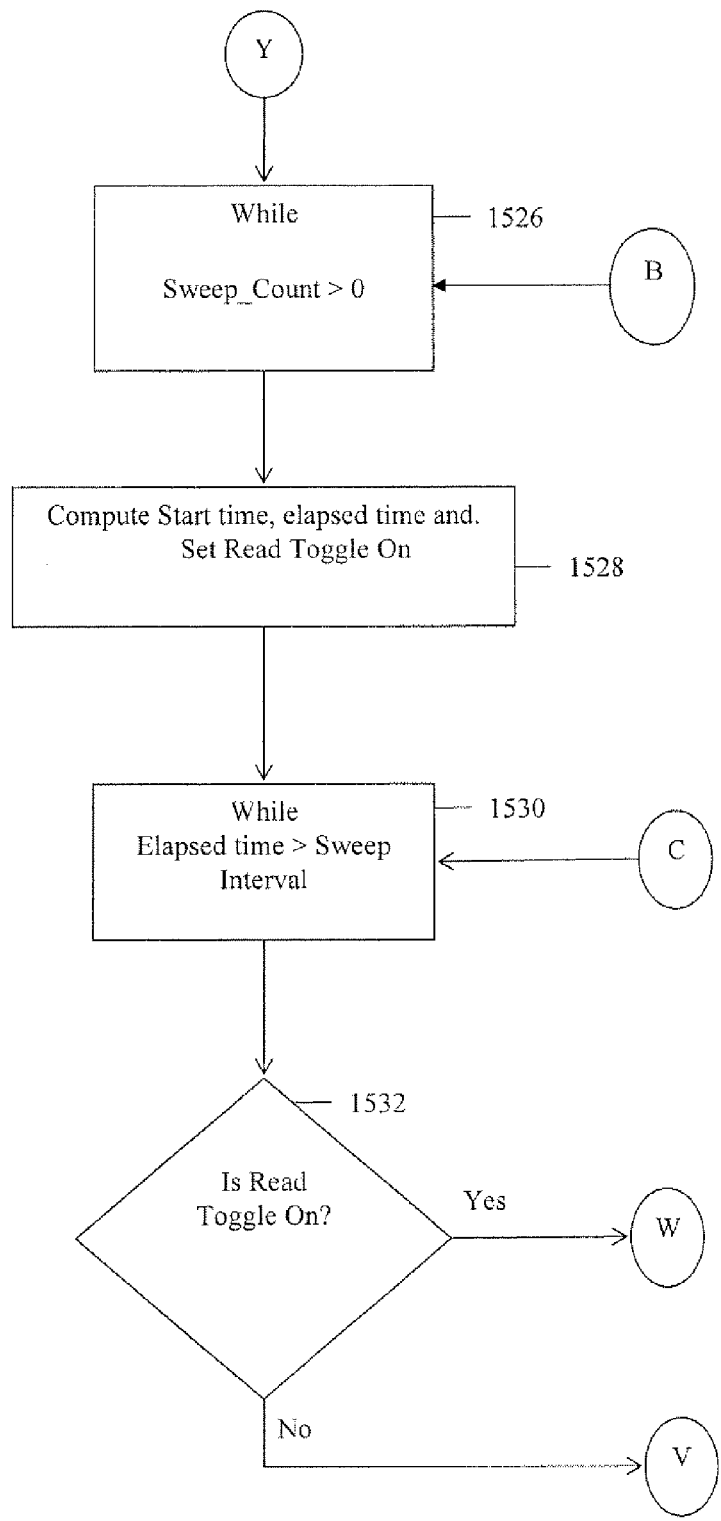
Figure 15D:
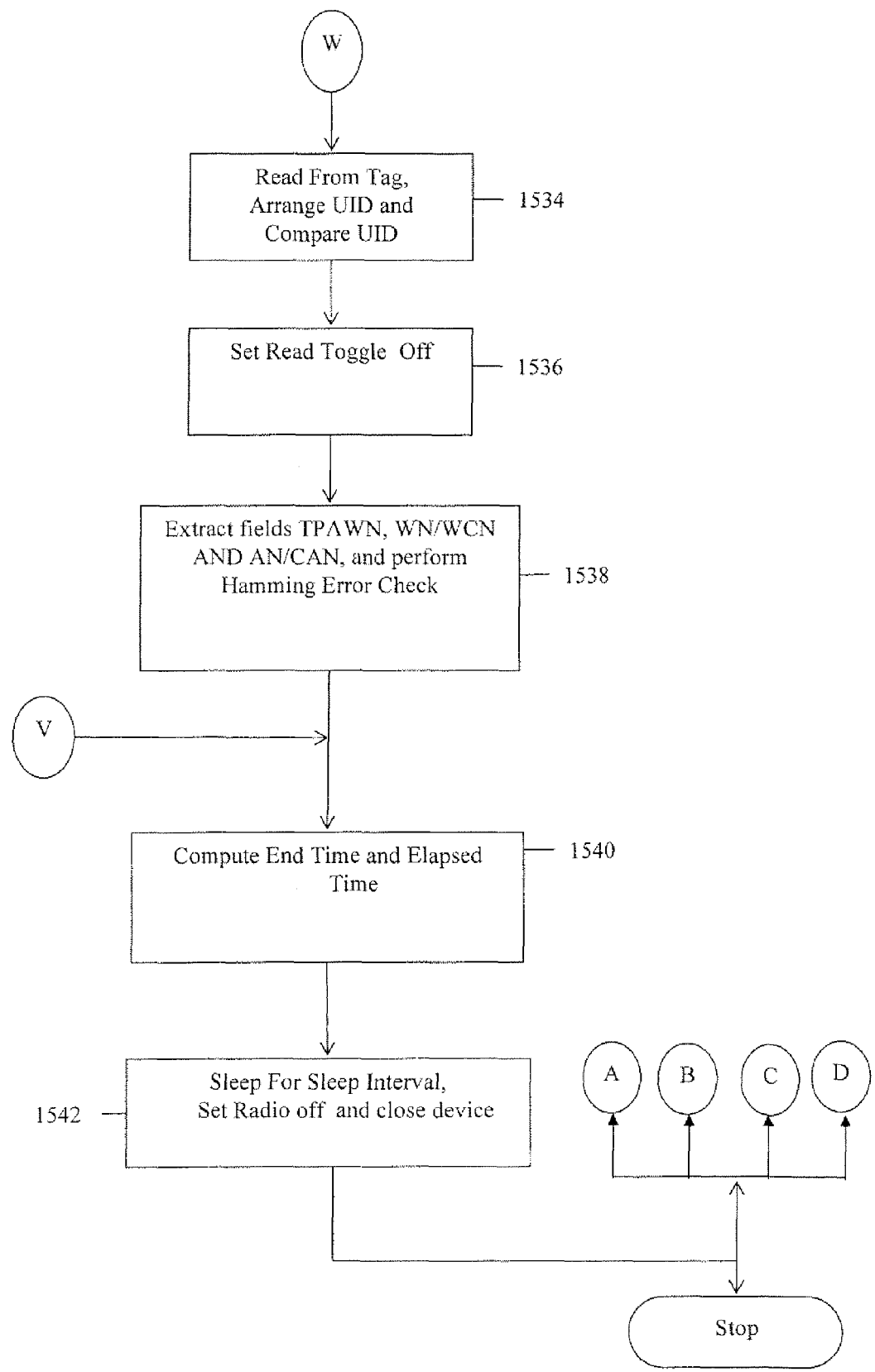

FIG. 14 illustrates a flowchart depicting simulation of theft condition by the RFID tool system. The steps of the flowchart are as follows: At step 1402, sanity check of the simulation files are performed. Thereafter, at step 1404, sanity check of sweep and sleep intervals are performed. Upon checking of the error correction mechanism value at step 1406, either one of ER_0 1408, ER_1 1410, ER_2 1412 and ER_3 1414 modes are selected. In various embodiments of the present invention, the ER_1 mode 1410 corresponds to performing error correction on WN, the ER_2 mode 1412 corresponds to performing error correction on WCN, and the ER_3 mode 1414 corresponds to performing error correction on both WN and WCN.

FIGS. 15a, 15b, 15c and 15d illustrates a flowchart depicting performing a theft condition by the RFID tool system. The steps of the flowchart are as follows: At step 1502, a template file for RFID reader PAWN is read by the system. Thereafter, at step 1504, the template file is converted to R-PAWN. At step 1506, a buffer file storing a UID is read and at step 1508 the content of the buffer file is converted into a UID. Further, at step 1510 all the RFID devices are enumerated. At step 1512, an RFID device is selected, its attributes are obtained and the device string descriptor is read. A check is then performed at step 1514 to ascertain whether the RFID device is a valid device.

In an embodiment of the present invention, if the RFID device is found to be invalid then at step 1516, an error flag is set confirming the presence of an invalid device. In another embodiment of the present invention, at step 1518, the RFID device firmware data is obtained by the system. Thereafter, all CRX14 devices are enumerated at step 1520 and at step 1522, a CRX14 device is selected and its parameters are obtained.

Subsequently, the sweep count is read at step 1524 and at step 1526 a counter is started for the time duration of the sweep count being more than zero. Thereafter, at step 1528, the time elapsed between the start of the sweep interval and initiation of communication with the RFID tag is calculated. At step 1530, if the time elapsed is greater than the sweep interval, then at step 1532, it is checked whether the read toggle is on. In an embodiment, if the read toggle is on, then at step 1534, upon initiation of communication with the RFID tag, data is read from the tag and the ID obtained is compared with the stored UID. Thereafter, at step 1536, the read toggle is set off. At step 1538, the fields T-PAWN, WN/WCN, AN/ACN are extracted and hamming error check is done. After computing the time elapsed at step 1540, the sleep interval is set and the device is closed at step 1544.

Figure 16:
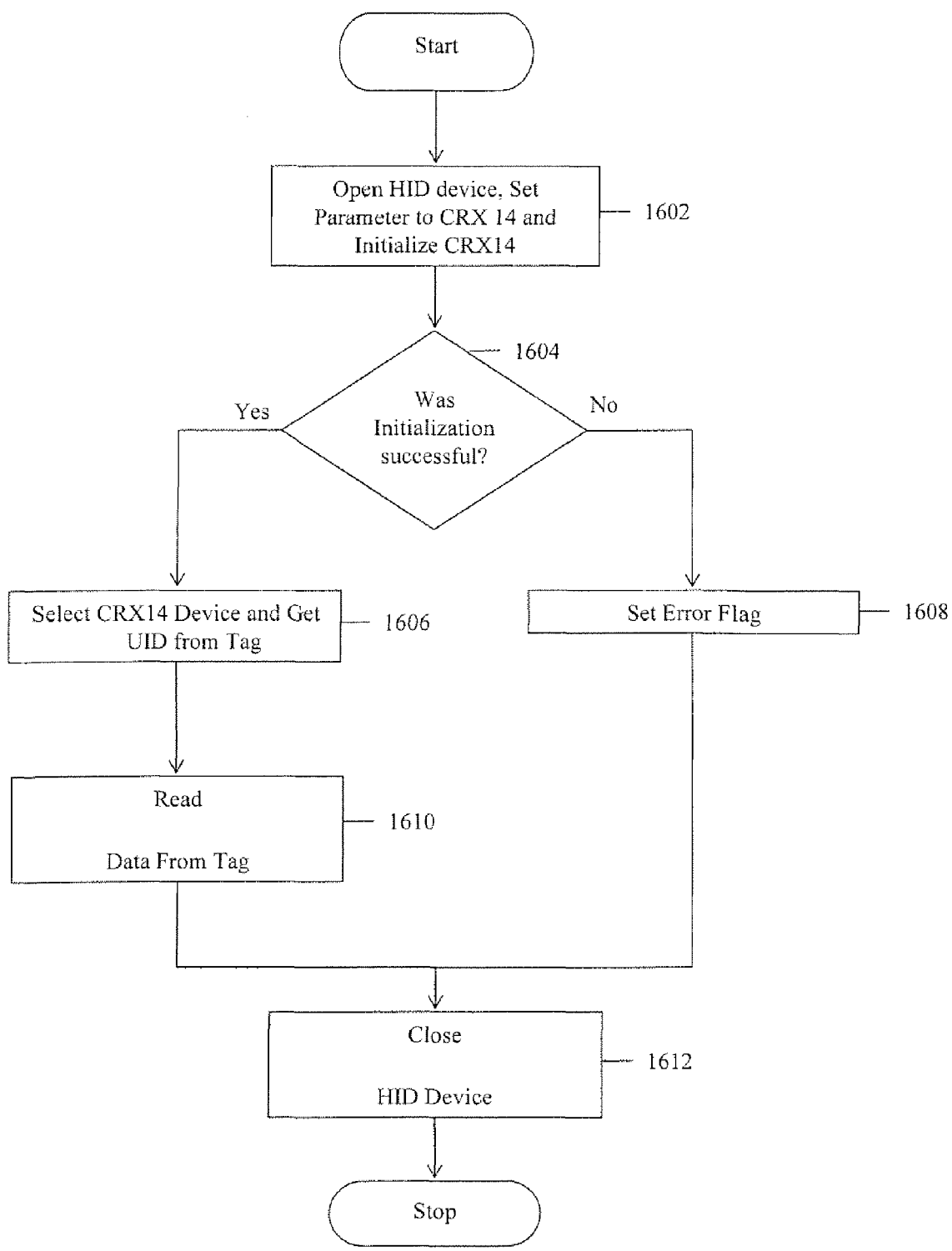
FIG. 16 illustrates reading of data from the RFID tag by the theft detection system.

FIG. 16 illustrates reading of data from the RFID tag by the theft detection system. The steps in the flowchart are: At step 1602, the HID device is opened and parameter is set to CRX14 and then CRX14 is initialized. At step 1604, it is then ascertained whether the initialization was successful. In an embodiment, if the initialization was found to be successful, at step 1606, the CRX14 device is selected and UID is obtained from the tag. Thereafter, at step 1608, data is read from the tag. Thereafter, at step 1610, the HID device is closed. In another embodiment, if the initialization is not found to be correct, an error flag is set indicating RFID tag not found by the system.

Figure 17:
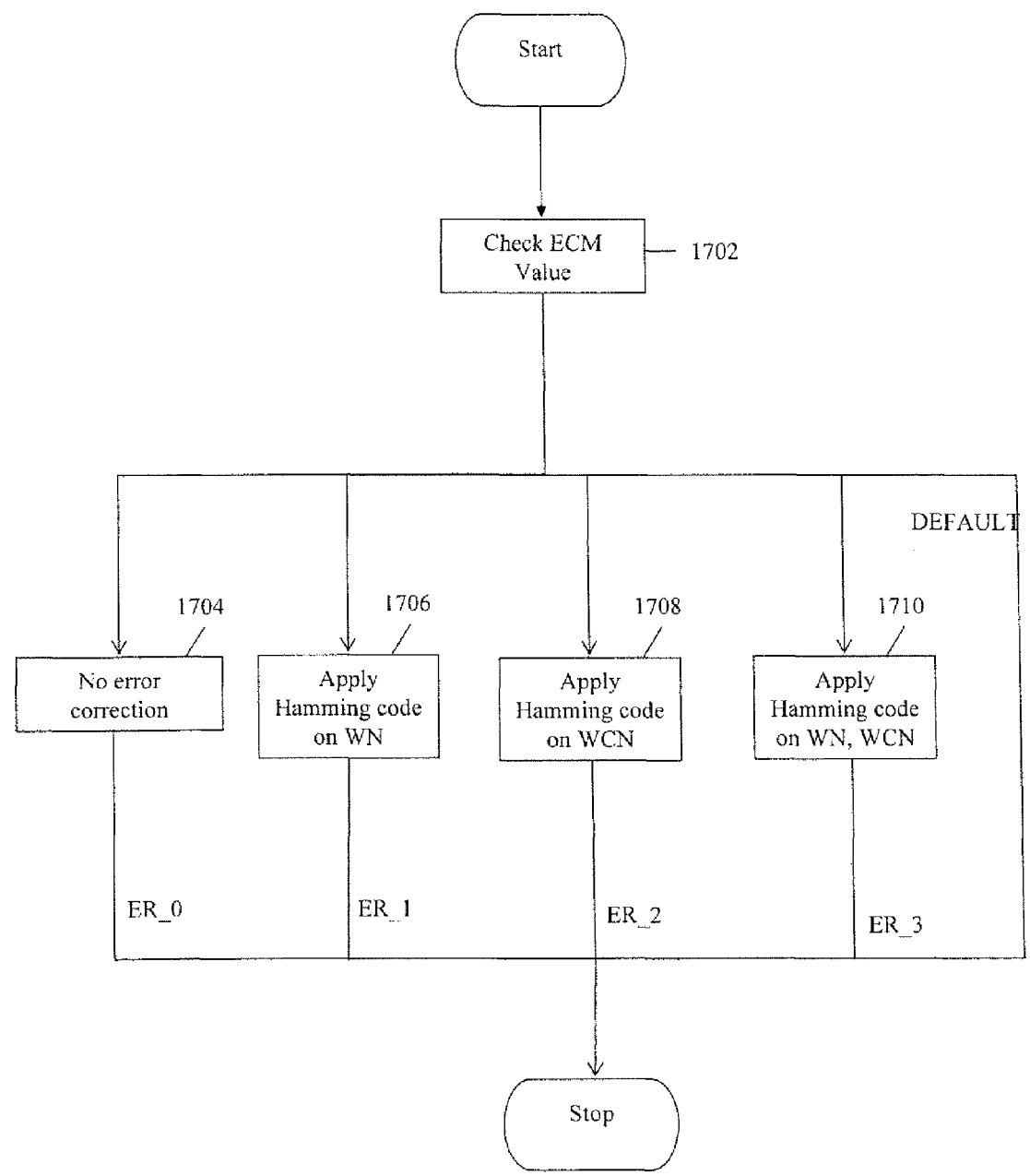
FIG. 17 illustrates performing hamming error correction by the theft detection system.

FIG. 17 illustrates performing hamming error correction by the theft detection system. The steps in the flowchart are: At step 1702, the error correction value is checked. In various embodiments of the present invention, based on the error correction value the system selects one of the options corresponding to the modes ER_0, ER_1, ER_2 and ER_3 illustrated in FIG. 14. In an embodiment of the present invention, the options corresponding to the modes ER_0, ER_1, ER_2 and ER_3 are: No error correction, apply ham code on WN, apply HAM code on WCN and apply HAM code on both WN and WCN.

Figure 18:
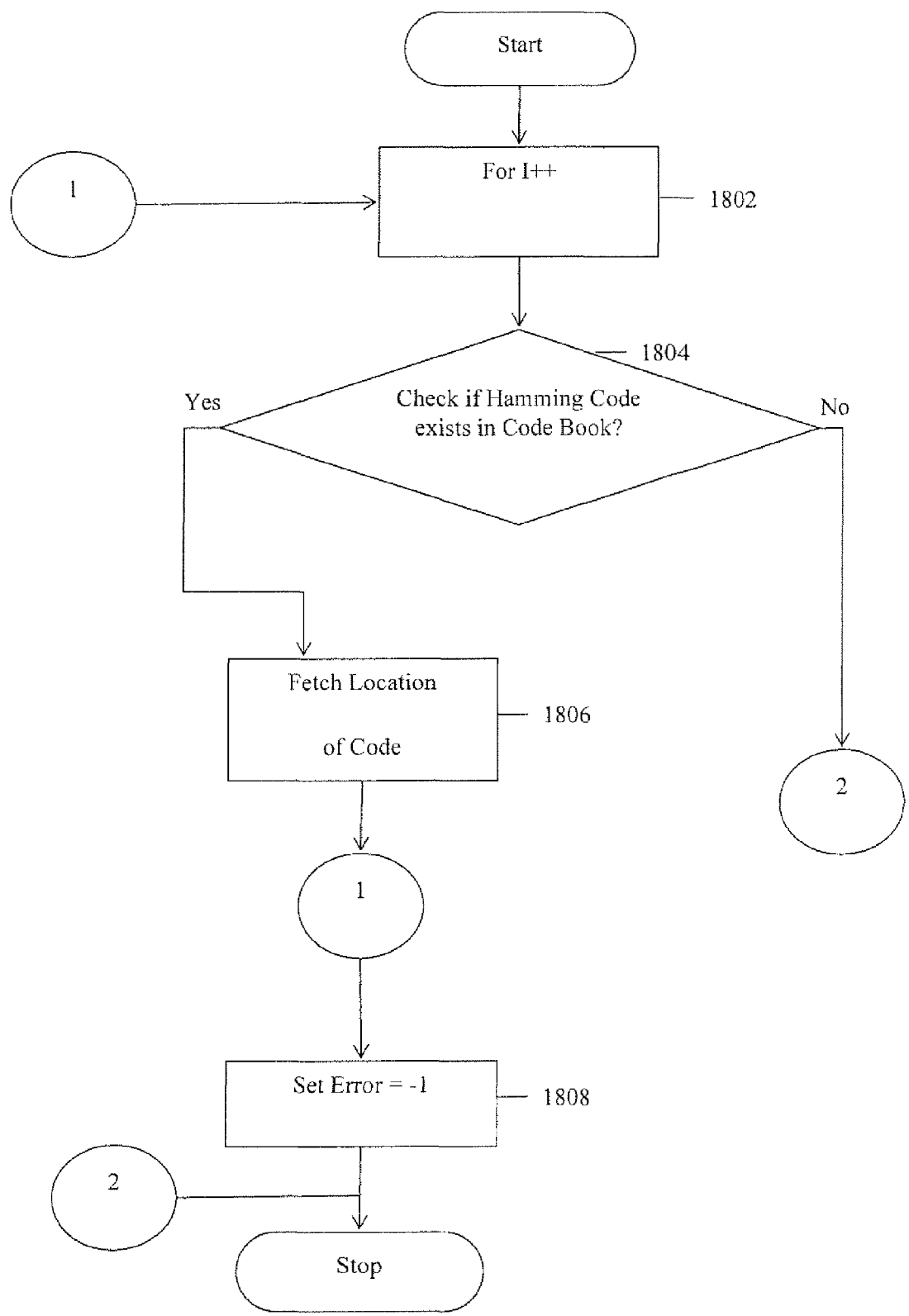
FIG. 18 illustrates fetching of location of hamming error correction code in a code book by the theft detection system.

FIG. 18 illustrates fetching of location of hamming error correction code in a code book by the theft detection system. As shown in the flowchart, at steps 1802 and 1804, the system checks for presence of hamming code in the memory locations of the code book. In an embodiment of the present invention, if the hamming code is found in the code book, then at step 1806, the location where the hamming code is stored is fetched. In an example, the location is a 16-bit data pointing to a memory location in the code book memory.

Figure 19:
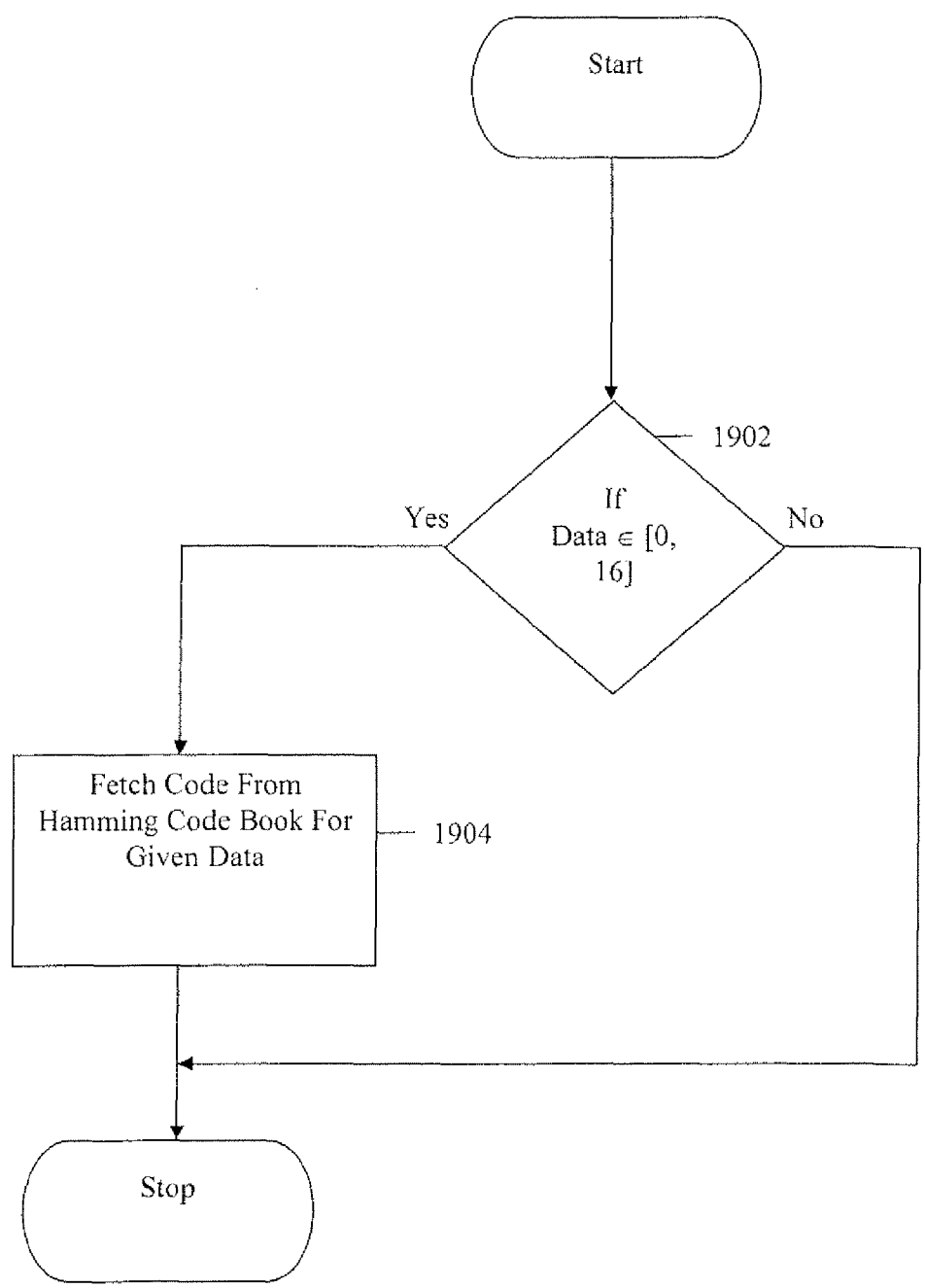
FIG. 19 illustrates fetching of hamming error correction code stored in a code book by the theft detection system.

FIG. 19 illustrates fetching of hamming error correction code stored in a code book by the theft detection system. At step 1902, it is ascertained if the location address of the hamming code fetched, as described in FIG. 18, is within the first 16 memory locations. Thereafter, at step 1904, the hamming code is fetched from the location. In an embodiment of the present invention, code to data and data to code operations can be used for hamming code implementation.

Figure 20:
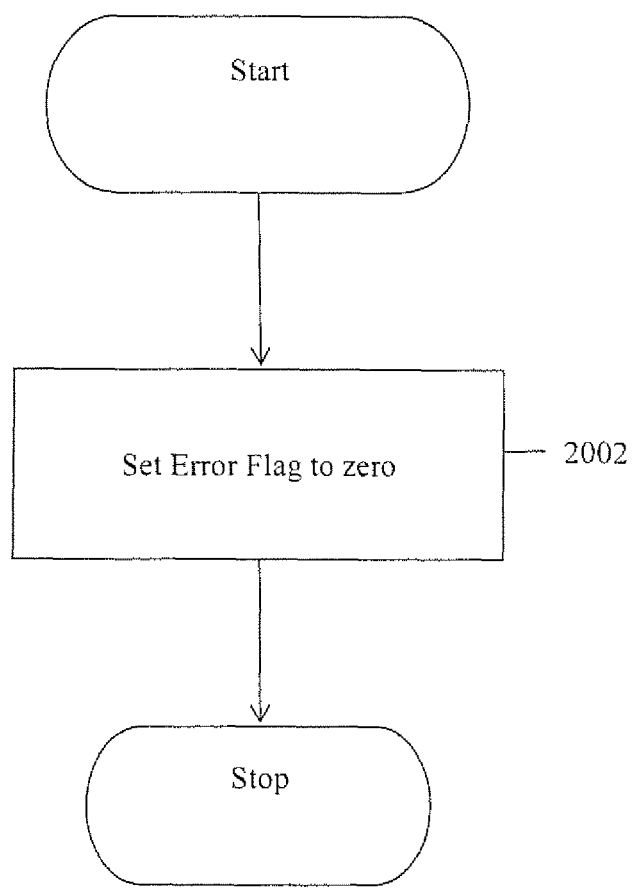
FIG. 20 illustrates the exit option from the RFID tool.

FIG. 20 illustrates the exit option from the RFID tool. At step 2002 an error flag is set to zero while closing the RFID tool. In an embodiment of the present invention, the error flag is cleared, so that the next operation is not affected.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for tracking one or more portable devices in real time to detect theft of the one or more portable devices, the method comprising the steps of:
interrogating a Radio Frequency Identification (RFID) tag via a RFID reader during successive sweep intervals, wherein the sweep interval represents active state of the RFID reader, and the RFID tag and the RFID reader reside in a wearable-band adapted to be worn by a user and in the one or more portable devices respectively, or vice versa;
receiving one or more pairing information from the RFID tag, wherein the step of receiving the one of more pairing information from the RFID tag comprises:
receiving a unique identifier comprising vendor specific information associated with the RFID reader and the wearable band; and
receiving a unique number allocated to each pair of the one or more portable devices and the wearable band;
comparing the received one or more pairing information with corresponding one or more pairing information stored in the RFID reader; and
generating an alert signal via the wearable-band or the one or more portable devices when the received one or more pairing information does not match with the corresponding one or more pairing information stored in the RFID reader.

2. The method of claim 1 further comprising the step of establishing a sleep interval between the successive sweep intervals, wherein the sleep interval represents inactive state of the RFID reader.

3. The method of claim 1 further comprising the step of generating an alert signal via the wearable-band or the one or more portable devices when the RFID tag fails to respond to the RFID reader.

4. The method of claim 1, wherein comparing the received one or more pairing information with corresponding one or more pairing information stored in the RFID reader comprises the steps of:
comparing the received unique identifier with the unique identifier stored in the RFID reader; and
comparing the received unique number associated with the RFID tag with the unique number associated with the RFID reader.

5. The method of claim 1, wherein the step of generating an alert signal via the wearable-band and the RFID reader when any one of the received pairing information does not match with the corresponding pairing information stored in the RFID reader comprises at least one of triggering an alarm system and triggering a visual display system.

6. A system for tracking one or more portable devices in real time to detect theft of the one or more portable devices, the system comprising:
one or more portable devices without processing capability, each comprising an RFID tag;
one or more portable devices with processing capability, each comprising a Radio frequency Identification (RFID) reader configured to interrogate an RFID tag during successive sweep intervals, wherein the sweep interval represents active state of the RFID reader;
a wearable-band adapted to be worn by a user, wherein the wearable band includes either one of the portable devices without processing capability, or one of the portable devices with processing capability;
wherein the one or more portable devices with processing capability are configured to:
receive one or more pairing information from an RFID tag, wherein receiving the one of more pairing information from the RFID tag comprises:
receiving a unique identifier corresponding to vendor specific information associated with the RFID reader and the RFID tag; and
receiving a unique number allocated to each pair of the RFID reader and the RFID tag;
compare the received one or more pairing information with corresponding one or more pairing information stored in the RFID reader; and
generate an alert signal via the wearable-band or the one or more portable devices when the received one or more pairing information does not match with the corresponding one or more pairing information stored in the RFID reader.

7. The system of claim 6 wherein the one or more portable devices with processing capability comprises any of mobile phones, personal digital assistants, laptops, smart phones, digital watch, digital camera, portable audio player, and portable video player.

8. The system of claim 6 wherein the one or more portable devices without processing capability comprises any of wallets, document holders, keys, and handbags.

9. The system of claim 6, wherein the one or more portable devices with processing capabilities comprises software modules configured to provide at least one of programmable time service, a user interface and a portable device feature control application programming interface to at least facilitate generating an alert to the user.

10. The system of claim 6, wherein the one or more portable devices with processing capabilities comprises hardware modules including at least one of system bus, memory mapped registers, interrupt line and circuit space on the printed circuit board of the one or more portable devices.

11. The system of claim 6, wherein the wearable-band paired with the one or more portable devices with processing capabilities comprises hardware modules including a battery operated alarm circuit integrated with the RFID tag.

12. The system of claim 6, wherein the wearable-band paired with the one or more portable devices with processing capability comprises a battery for operating the RFID reader, an alarm circuit and a display unit in a user interface of the wearable-band.

13. The system of claim 6, wherein the wearable-band paired with the one or more portable devices with processing capability comprises software modules configured to provide at least one of a programmable time service, application programming interfaces to at least facilitate generating an alert to the user employing an alarm circuit and a display unit.

14. A method for tracking one or more portable devices in real time to detect theft of the one or more portable devices, the method comprising the steps of:
   interrogating a Radio Frequency Identification (RFID) tag via a RFID reader during successive sweep intervals, wherein the sweep interval represents active state of the RFID reader, and the RFID tag and the RFID reader reside in a wearable band adapted to be worn by a user and in the one or more portable devices respectively or vice versa;
   receiving one or more pairing information from the RFID tag;
   comparing the received one or more pairing information with corresponding one or more pairing information stored in the RFID reader; and
   generating an alert signal via the wearable band or the one or more portable devices when the received one or more pairing information does not match with the corresponding one or more pairing information stored in the RFID reader, wherein generating an alert signal via the wearable band or the one or more portable devices comprises:
   measuring a first time value at the start of the sweep interval;
      measuring a second time value when the received one or more pairing information does not match with the one or more pairing information stored in the RFID reader;
      calculating a difference between the second time value and the first time value to obtain a third time value;
      comparing the third time value with a pre-determined false alarm threshold value; and
      generating an alert signal when the third time value exceeds the predetermined false alarm threshold.

15. A method for tracking one or more portable devices in real time to detect theft of the one or more portable devices, the method comprising the steps of:
   interrogating a Radio Frequency Identification (RFID) tag via a RFID reader during successive sweep intervals, wherein the sweep interval represents active state of the RFID reader, and the RFID tag and the RFID reader reside in a wearable band adapted to be worn by a user and the one or more portable devices respectively or vice versa;
   receiving one or more pairing information from the RFID tag;
   performing selective error correction using hamming code on the pairing information received from the RFID tag;
   comparing the received one or more pairing information with corresponding one or more pairing information stored in the RFID reader; and
   generating an alert signal via the wearable band or the one or more portable devices when the received one or more pairing information does not match with the corresponding one or more pairing information stored in the RFID reader.

16. A method for tracking one or more portable devices in real time to detect theft of the one or more portable devices, the method comprising the steps of:
   interrogating a Radio Frequency Identification (RFID) tag via a RFID reader during successive sweep intervals, wherein the sweep interval represents active state of the RFID reader, and the RFID tag and the RFID reader reside in a wearable band adapted to be worn by a user and the one or more portable devices respectively or vice versa;
   receiving one or more pairing information from the RFID tag;
   mapping information related to multiple portable devices with information stored in a lookup table in the wearable band, wherein the wearable band comprises multiple RFID tags;
   comparing the received one or more pairing information with corresponding one or more pairing information stored in the RFID reader; and
   generating an alert signal via the wearable band or the one or more portable devices when the received one or more pairing information does not match with the corresponding one or more pairing information stored in the RFID reader.

17. A system for tracking one or more portable devices in real time to detect theft of the one or more portable devices, the system comprising:
   one or more portable devices without processing capability, each comprising an RFID tag;
   one or more portable devices with processing capability, each comprising a Radio frequency Identification (RFID) reader configured to interrogate an RFID tag during successive sweep intervals, wherein the sweep interval represents active state of the RFID reader;
   a wearable-band adapted to be worn by a user, wherein the wearable band includes either one of the portable devices without processing capability, or one of the portable devices with processing capability;
   wherein the one or more portable devices with processing capability are configured to:
   receive one or more pairing information from an RFID tag
   compare the received one or more pairing information with corresponding one or more pairing information stored in the RFID reader; and generate an alert signal via the wearable-band or the one or more portable devices when the received one or more pairing information does not match with the corresponding one or more pairing information stored in the RFID reader, wherein generating an alert signal via the wearable band or the one or more portable devices comprises:

measuring a first time value at the start of the sweep interval;

measuring a second time value when the received one or more pairing information does not match with the one or more pairing information stored in the RFID reader;

calculating a difference between the second time value and the first time value to obtain a third time value;

comparing the third time value with a predetermined false alarm threshold value; and generating an alert signal when the third time value exceeds the predetermined false alarm threshold value.

18. A system for tracking one or more portable devices in real time to detect theft of the one or more portable devices, the system comprising:

one or more portable devices without processing capability, each comprising an RFID tag;

one or more portable devices with processing capability, each comprising a Radio frequency Identification (RFID) reader configured to interrogate an RFID tag during successive sweep intervals, wherein the sweep interval represents active state of the RFID reader;

a wearable-band adapted to be worn by a user, wherein the wearable band includes either one of the portable devices without processing capability, or one of the portable devices with processing capability;

wherein the one or more portable devices with processing capability are configured to:

receive one or more pairing information from an RFID tag;

perform selective error correction using hamming code on the pairing information received from the RFID tag;

compare the received one or more pairing information with corresponding one or more pairing information stored in the RFID reader; and generate an alert signal via the wearable-band or the one or more portable devices when the received one or more pairing information does not match with the corresponding one or more pairing information stored in the RFID reader.

* * * * *

UNITED STATES PATENT AND TRADEMARK OFFICE
CERTIFICATE OF CORRECTION

PATENT NO. : 8,427,319 B2
APPLICATION NO. : 12/632133
DATED : April 23, 2013
INVENTOR(S) : Sunil Kumar Vuppala et al.

Page 1 of 1

It is certified that error appears in the above-identified patent and that said Letters Patent is hereby corrected as shown below:

In the claims,

Col. 15, Line 57, "does" should read --do--.
Col. 16, Line 5, "a" should read --an--.
Col. 16, Line 20, "does" should read --do--.
Col. 16, Line 27, "a" should read --an--.
Col. 16, Line 44, "does" should read --do--.
Col. 16, Line 63, after "tag" insert --;--.
Col. 17, Line 3, "does" should read --do--.
Col. 17, Line 10, "does" should read --do--.
Col. 18, Line 20, "does" should read --do--.

Signed and Sealed this
Fourteenth Day of April, 2015

Michelle K. Lee
*Director of the United States Patent and Trademark Office*

UNITED STATES PATENT AND TRADEMARK OFFICE
CERTIFICATE OF CORRECTION

PATENT NO.         : 8,427,319 B2                                              Page 1 of 2
APPLICATION NO.    : 12/632133
DATED              : April 23, 2013
INVENTOR(S)        : Sunil Kumar Vuppala, Puneet Gupta and Kirti Chawla It is certified that error appears in the above-identified patent and that said Letters Patent is hereby corrected as shown below:

Title Page, (57), Line 4, "tag via a RFID" should read --tag via an RFID--.

In the specification,

Col. 1, Line 20, "includes" should read --include--.
Col. 1, Line 23, "device" should read --devices--.
Col. 1, Line 54, "facilitates" should read --facilitate--.
Col. 1, Line 60, after "to" insert --a--.
Col. 2, Line 2, "a" should read --an--.
Col. 2, Line 11, "does" should read --do--.
Col. 2, Line 44, "does" should read --do--.
Col. 2, Line 55, "do" should read --does--.
Col. 3, Line 7, "comprises" should read --comprise--.
Col. 3, Line 8, "a" should read --an--.
Col. 3, Line 16, "comprises" should read --comprise--.
Col. 3, Line 22, "comprises" should read --comprise--.
Col. 3, Line 26, "comprises" should read --comprise--.
Col. 3, Line 32, "comprises" should read --comprise--.
Col. 4, Line 12, after "or" insert --more--.
Col. 4, Line 50, "provides" should read --provide--.
Col. 4, Line 55, "provides" should read --provide--.
Col. 4, Line 60, "enables" should read --enable--.
Col. 5, Line 4, "is" should read --are--.
Col. 5, Line 29, "PDA's" should read --PDAs--.
Col. 7, Line 17, after "following" insert --:--.

This certificate supersedes the Certificate of Correction issued April 14, 2015.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,427,319 B2

Col. 9, Line 5, after "mode" insert --there are--.
Col. 10, Line 36, after "or" insert --more--.
Col. 10, Line 40, "a" should read --an--.
Col. 10, Line 47, "is" should read --are--.
Col. 11, Line 7, "does" should read --do--.
Col. 11, Line 27, "does" should read --do--.
Col. 11, Line 36, "matches" should read --match--.
Col. 12, Line 19, "are" should read --is--.
Col. 12, Line 20, "are" should read --is--.
Col. 12, Line 23, "are" should read --is--.
Col. 12, Line 28, "illustrates" should read --illustrate--.
Col. 13, Line 56, "a" should read --an--.
Col. 14, Line 8, "does" should read --do--.
Col. 14, Line 63, "does" should read --do--.
Col. 14, Line 67, "comprises" should read --comprise--.
Col. 15, Line 5, "comprises" should read --comprise--.
Col. 15, Line 8, "comprises" should read --comprise--.
Col. 15, Line 14, "comprises" should read --comprise--.
Col. 15, Line 37, "a" should read --an--.
Col. 15, Line 50, "does" should read --do--.

In the claims,

Col. 15, Line 57, "does" should read --do--.
Col. 16, Line 5, "a" should read --an--.
Col. 16, Line 20, "does" should read --do--.
Col. 16, Line 27, "a" should read --an--.
Col. 16, Line 44, "does" should read --do--.
Col. 16, Line 63, after "tag" insert --;--.
Col. 17, Line 3, "does" should read --do--.
Col. 17, Line 10, "does" should read --do--.
Col. 18, Line 20, "does" should read --do--.